US011034409B2

(12) United States Patent
Hebert et al.

(10) Patent No.: US 11,034,409 B2
(45) Date of Patent: Jun. 15, 2021

(54) SUSPENSION ASSEMBLY FOR A VEHICLE

(71) Applicant: BOMBARDIER RECREATIONAL PRODUCTS INC., Valcourt (CA)

(72) Inventors: Sebastien Hebert, Sherbrooke (CA); Emile Maltais-Larouche, Valcourt (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 0 days.

(21) Appl. No.: 16/633,996

(22) PCT Filed: Jul. 27, 2018

(86) PCT No.: PCT/IB2018/055650
§ 371 (c)(1),
(2) Date: Jan. 24, 2020

(87) PCT Pub. No.: WO2019/025926
PCT Pub. Date: Feb. 7, 2019

(65) Prior Publication Data
US 2020/0198724 A1 Jun. 25, 2020

Related U.S. Application Data

(60) Provisional application No. 62/539,023, filed on Jul. 31, 2017.

(51) Int. Cl.
*B62K 25/28* (2006.01)
*B60G 3/14* (2006.01)
(Continued)

(52) U.S. Cl.
CPC ............. *B62K 25/283* (2013.01); *B60G 3/14* (2013.01); *B62K 25/005* (2013.01);
(Continued)

(58) Field of Classification Search
CPC .... B62K 25/283; B62K 25/005; B62K 5/027; B62K 5/05; B62K 5/06; B62K 5/08;
(Continued)

(56) References Cited

U.S. PATENT DOCUMENTS 4,379,567 A 4/1983 Ribi
4,415,057 A 11/1983 Yamaguchi
(Continued)

FOREIGN PATENT DOCUMENTS

CN 101172501 A 5/2008
JP 2004-352209 12/2004
(Continued)

OTHER PUBLICATIONS

English Abstract of JP2004-352209; Retreived from https://worldwide.espacenet.com/.
(Continued)

Primary Examiner — Darlene P Condra
(74) Attorney, Agent, or Firm — BCF LLP

(57) ABSTRACT

A suspension assembly for a vehicle includes a swing arm having a proximal end configured to be pivotally connected to a frame of the vehicle, and a distal end configured to support a ground-engaging member of the vehicle. The suspension assembly also includes a rocker link pivotally connected to the swing arm about a rocker link pivot axis from which first and second portions of the rocker link extend in divergent directions. The suspension assembly also includes a linking arm configured to be pivotally connected to the frame, and pivotally connected to the first portion of the rocker link. The suspension assembly also includes a shock absorber that is at least one of: pivotally connected to the linking arm, and configured to be pivotally connected to the frame. The shock absorber is pivotally connected to the second portion of the rocker link.

25 Claims, 14 Drawing Sheets

(51) Int. Cl.
*B62K 25/00* (2006.01)
*B62K 5/027* (2013.01)
*B62K 5/05* (2013.01)
*B62K 5/06* (2006.01)
*B62K 5/08* (2006.01)
*B62K 5/00* (2013.01)

(52) U.S. Cl.
CPC .... *B60G 2200/422* (2013.01); *B60G 2204/13* (2013.01); *B60G 2300/122* (2013.01); *B62K 5/027* (2013.01); *B62K 5/05* (2013.01); *B62K 5/06* (2013.01); *B62K 5/08* (2013.01); *B62K 2005/001* (2013.01)

(58) Field of Classification Search
CPC .. B62K 2005/001; B62K 19/30; B62K 25/28; B62K 25/20; B60G 3/14; B60G 2200/422; B60G 2204/13; B60G 2300/122; B60G 2200/13; B60G 2200/144; B60G 2200/44; B60G 3/20; B62M 17/00
See application file for complete search history.

(56) References Cited

U.S. PATENT DOCUMENTS

| | | | |
|---|---|---|---|
| 4,489,803 A | 12/1984 | Fukuchi | |
| 4,596,302 A | 6/1986 | Suzuki et al. | |
| 4,830,391 A | 5/1989 | Silk | |
| RE34,897 E | 4/1995 | Richardson et al. | |
| 5,611,557 A * | 3/1997 | Farris | B62K 3/04 |
| | | | 280/275 |
| 6,024,185 A | 2/2000 | Okada et al. | |
| 6,948,581 B2 | 9/2005 | Fecteau et al. | |
| 7,237,637 B2 | 7/2007 | Fecteau et al. | |
| 7,416,046 B2 | 8/2008 | Aube et al. | |
| 7,416,946 B2 | 8/2008 | Park | |
| 7,464,781 B2 | 12/2008 | Guay et al. | |
| 7,543,672 B2 | 6/2009 | Codere et al. | |
| 7,568,541 B2 | 8/2009 | Pfeil et al. | |
| 7,571,787 B2 | 8/2009 | Saiki | |
| 7,588,110 B2 | 9/2009 | Martino | |
| 7,610,979 B1 | 11/2009 | Dykowski et al. | |
| 7,665,742 B2 | 2/2010 | Haerr et al. | |
| 7,770,683 B2 | 8/2010 | Keogh et al. | |
| 7,806,215 B2 | 10/2010 | Codere et al. | |
| 7,837,213 B2 * | 11/2010 | Colegrove | B62K 25/04 |
| | | | 280/284 |
| 7,926,607 B2 | 4/2011 | Seiter | |
| 7,997,372 B2 | 8/2011 | Maltais | |
| 8,074,759 B2 | 12/2011 | Morin et al. | |
| 8,086,382 B2 | 12/2011 | Dagenais et al. | |
| 8,260,535 B2 | 9/2012 | Dagenais | |
| 8,438,942 B2 | 5/2013 | Wilflinger et al. | |
| 8,544,587 B2 | 10/2013 | Holroyd et al. | |
| 8,577,588 B2 | 11/2013 | Dagenais | |
| 8,655,565 B2 | 2/2014 | Dagenais et al. | |
| 8,695,746 B2 | 4/2014 | Holroyd et al. | |
| 9,004,214 B2 | 4/2015 | Holroyd et al. | |
| 9,020,744 B2 | 4/2015 | Dagenais | |
| 9,043,111 B2 | 5/2015 | Dagenais et al. | |
| 2003/0221890 A1 | 12/2003 | Fecteau et al. | |
| 2004/0195799 A1 | 10/2004 | Toyoda | |
| 2005/0039967 A1 | 2/2005 | Aube et al. | |
| 2005/0116437 A1 | 6/2005 | Furukawa et al. | |
| 2006/0254842 A1 | 11/2006 | Dagenais et al. | |
| 2007/0175691 A1* | 8/2007 | Gogo | F16F 9/065 |
| | | | 180/227 |
| 2007/0199756 A1 | 8/2007 | Kofuji | |
| 2007/0256882 A1 | 11/2007 | Bedard et al. | |
| 2008/0179852 A1 | 7/2008 | Fujita | |
| 2009/0057046 A1 | 3/2009 | Kofuji | |
| 2009/0152940 A1 | 6/2009 | Mercier et al. | |
| 2009/0321169 A1 | 12/2009 | Bedard et al. | |
| 2010/0263956 A1 | 10/2010 | Bedard et al. | |
| 2011/0079458 A1 | 4/2011 | Nishiyama et al. | |
| 2011/0108346 A1 | 5/2011 | Nimura | |
| 2011/0168473 A1 | 7/2011 | Bedard et al. | |
| 2013/0186701 A1 | 7/2013 | Bedard et al. | |
| 2015/0073643 A1 | 3/2015 | Hall et al. | |
| 2015/0122567 A1 | 5/2015 | Marois et al. | |
| 2015/0175209 A1 | 6/2015 | Holroyd et al. | |
| 2015/0274213 A1 | 10/2015 | Rudwal et al. | |
| 2016/0096583 A1 | 4/2016 | Kawai | |
| 2016/0200391 A1* | 7/2016 | Ishida | B62K 11/04 |
| | | | 180/227 |
| 2017/0057583 A1 | 3/2017 | Yokoyama | |
| 2017/0129562 A1 | 5/2017 | Hirakawa et al. | |
| 2018/0229797 A1* | 8/2018 | Makihara | B62K 11/04 |
| 2018/0273136 A1* | 9/2018 | Voss | B62K 25/283 |

FOREIGN PATENT DOCUMENTS

| | | |
|---|---|---|
| WO | WO2015036983 A2 | 3/2015 |
| WO | WO2015036984 A1 | 3/2015 |
| WO | WO2015036985 A1 | 3/2015 |
| WO | WO2015079425 A1 | 6/2015 |
| WO | WO2015079426 A1 | 6/2015 |

OTHER PUBLICATIONS

International Search Report of PCT/IB2018/055650; dated Oct. 16, 2018; Shane Thomas.
International Search Report of PCT/IB2018/055651; dated Jan. 11, 2019; Shane Thomas.
Supplementary European Search Report of European Patent Application No. 18841761.2; The Hague; Jul. 20, 2020; Luis Verdelho.
Sport Racer Network, Stohr Chassis, Jan. 20, 2006 [retrieved on Feb. 4, 2020]. Retrieved from the Internet: <http://sports.racer.net/chassis/stohr/index.htm>.
Supplementary European Search Report of Corresponding European Application No. 18841108.6; The Hague; Jun. 5 2020; Verdelho, Luis.

* cited by examiner

SUSPENSION ASSEMBLY FOR A VEHICLE

CROSS-REFERENCE

The present application claims priority to U.S. Provisional Patent Application No. 62/539,023 filed on Jul. 31, 2017, the entirety of which is incorporated herein by reference.

FIELD OF TECHNOLOGY

The present technology relates to a suspension assembly for a vehicle, and in particular to the suspension assembly of a three-wheeled vehicle.

BACKGROUND

Three-wheeled straddle-seat vehicles have been developed for road use with a desire to combine the riding qualities experienced in four wheeled automobiles and two wheeled motorcycles.

For example, automobiles are inherently more stable than motorcycles due to the presence of four wheels, but motorcycles have greater maneuverability due to the smaller size and weight of motorcycles. Three-wheeled straddle-seat vehicles are more stable than motorcycles while providing a similar driving experience. Three-wheeled straddle-seat vehicles are therefore quite popular for touring and sport purposes.

For vehicle stability, it is desirable to have a low center of gravity. One limiting factor in lowering the center of gravity in three-wheeled vehicles is their suspension assemblies. In particular, vehicles having two front wheels and a single rear wheel typically have a suspension assembly that includes a rear swing arm with a generally vertical shock absorber (i.e., a "swing arm suspension assembly") to which a single laterally central wheel is mounted. The swing arm suspension assembly can be bulky and its configuration can impede lowering the center of gravity of the vehicle.

Furthermore, the performance of the shock absorber is typically correlated to the cost of the shock absorber and it can thus be expensive to implement a shock absorber that offers a desired performance.

There is therefore a desire for a vehicle having a suspension assembly with a low center of gravity and offering good performance.

SUMMARY

It is an object of the present technology to ameliorate at least some of the inconveniences described above.

According to various aspects of the present technology, there is provided a suspension assembly for a vehicle. The suspension assembly has a swing arm having a proximal end pivotally connected to a frame of the vehicle and a distal end supporting a ground-engaging member of the vehicle. The suspension assembly also includes a rocker link, a linking arm and a shock absorber which are pivotally connected between the swing arm and the frame to control motion of the swing arm relative to the frame of the vehicle. The linkage system that is constituted by the rocker link, the linking arm and the shock absorber is advantageously compact and configured to lower a center of gravity of the vehicle compared to similar conventional suspension assembly designs.

According to one aspect of the present technology, there is provided a suspension assembly for a vehicle. The suspension assembly has a swing arm which has a proximal end and a distal end. The proximal end of the swing arm is configured to be pivotally connected to a frame of the vehicle about a swing arm pivot axis. The distal end of the swing arm is configured to support a ground-engaging member of the vehicle. The suspension assembly also has a rocker link pivotally connected to the swing arm about a rocker link pivot axis. The rocker link has a first portion and a second portion extending in divergent directions from the rocker link pivot axis. The suspension assembly also has a linking arm configured to be pivotally connected to the frame of the vehicle about a first linking arm pivot axis. The linking arm is pivotally connected to the first portion of the rocker link about a second linking arm pivot axis. The suspension assembly also has a shock absorber that is pivotable about a first shock absorber pivot axis. The shock absorber is at least one of: pivotally connected to the linking arm about the first shock absorber pivot axis, and configured to be pivotally connected to the frame about the first shock absorber pivot axis. The shock absorber is pivotally connected to the second portion of the rocker link about a second shock absorber pivot axis.

In some implementations, a distance between the second shock absorber pivot axis and the rocker link pivot axis is different from a distance between the second linking arm pivot axis and the rocker link pivot axis.

In some implementations, the distance between the second shock absorber pivot axis and the rocker link pivot axis is greater than the distance between the second linking arm pivot axis and the rocker link pivot axis.

In some implementations, when the suspension assembly is in a driver loaded state, a distance between the first linking arm pivot axis and the second linking arm pivot axis is greater than a distance between the first shock absorber pivot axis and the second shock absorber pivot axis.

In some implementations, the shock absorber is pivotally connected to the linking arm, and the first shock absorber pivot axis and the first linking arm pivot axis are offset from one another.

In some implementations, the first shock absorber pivot axis and the first linking arm pivot axis are coaxial.

In some implementations, the shock absorber is configured to be pivotally connected to the frame about the first shock absorber pivot axis.

In some implementations, independent of a load state of the suspension assembly, an axis passing through the second shock absorber pivot axis and the second linking arm pivot axis extends more vertically than horizontally.

In some implementations, the first linking arm pivot axis is vertically higher than the swing arm pivot axis.

In some implementations, an axis extending through the first shock absorber pivot axis and the second shock absorber pivot axis intersects the first linking arm pivot axis.

In some implementations, the shock absorber extends generally horizontally in a full bump state of the suspension assembly.

In some implementations, the shock absorber and the rocker link form an acute angle in a full droop state of the suspension assembly.

In some implementations, the shock absorber has a damper and a spring.

In some implementations, the swing defines a hollow space, and the rocker link, the linking arm and the shock absorber at least partially extend within the hollow space.

In some implementations, the shock absorber is disposed above the linking arm.

In some implementations, the rocker link and the linking arm form an acute angle.

In some implementations, the second portion of the rocker link is vertically above the first portion of the rocker link.

In some implementations, the rocker link, the linking arm and the shock absorber extend through a common vertical plane.

In some implementations, a vehicle has a frame, the suspension assembly, and a ground-engaging member connected to the distal end of the swing arm of the suspension assembly.

In some implementations, the vehicle has a muffler that extends below the rocker link, the linking arm and the shock absorber.

In some implementations, the vehicle has a muffler. The linking arm is positioned, vertically, between the muffler and the shock absorber.

In some implementations, the ground-engaging member of the vehicle is a wheel having a wheel rotations axis. The swing arm pivot axis and the wheel rotations axis extend along a plane, and the linking arm extends across the plane.

In some implementations, the suspension assembly of the vehicle is a rear suspension assembly.

For the purposes of the present application, terms related to spatial orientation such as forward, rearward, front, rear, upper, lower, left, and right, are as they would normally be understood by a driver of the vehicle sitting therein in a normal driving position with the vehicle being upright and steered in a straight ahead direction.

Explanations and/or definitions of terms provided in the present application take precedence over explanations and/or definitions of these terms that may be found in the document incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not necessarily to scale.

DETAILED DESCRIPTION

The present technology will be described herein with respect to a three-wheeled straddle-type vehicle 10. It is contemplated that at least some aspects of the present technology could also be implemented with vehicles having two, four, or more wheels. The present technology will be described herein with respect to a rear swing arm suspension assembly, although it is contemplated that at least some aspects of the present technology could also be implemented in a front swing arm suspension assembly.

Figure 1:
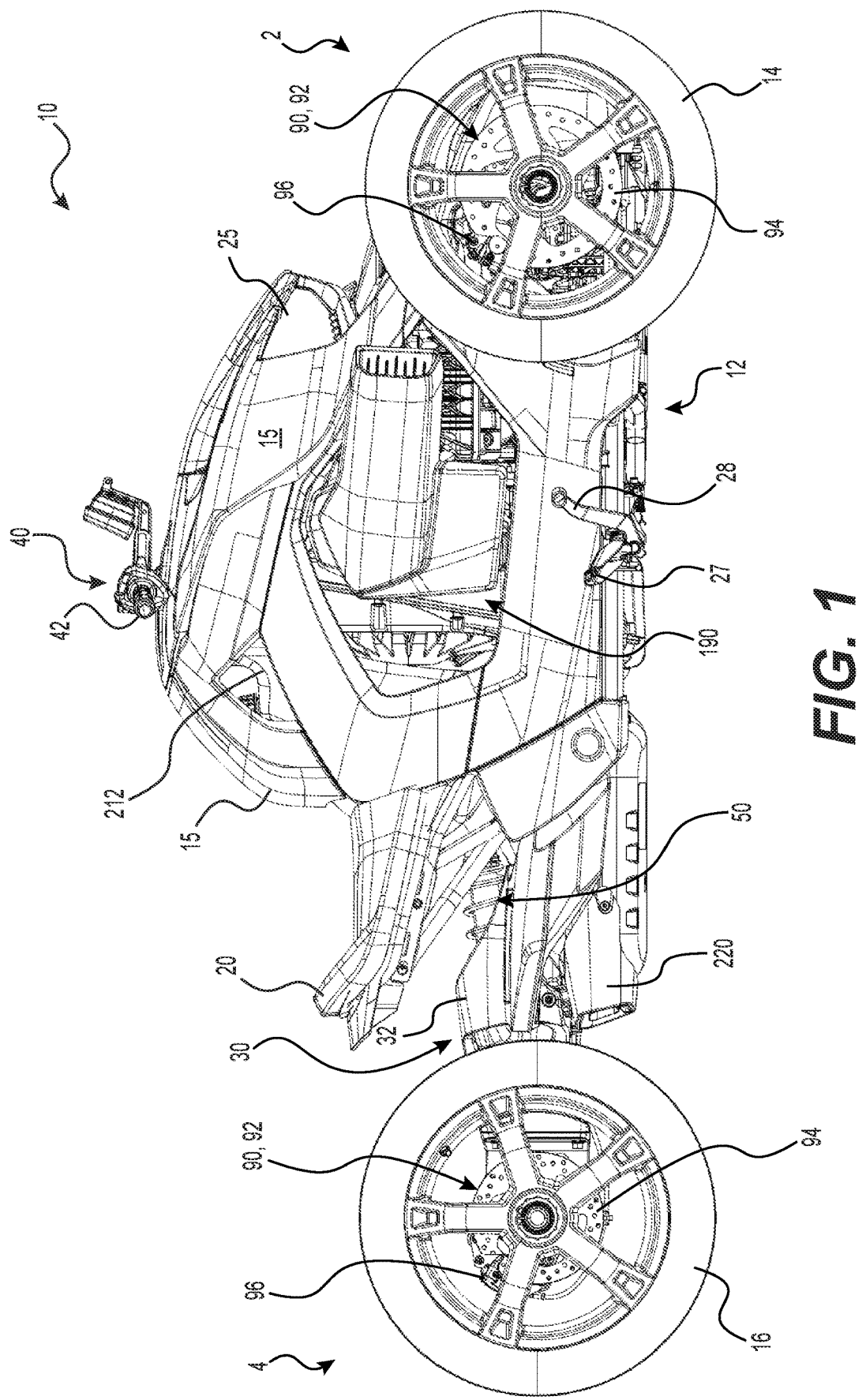
FIG. 1 is a right side elevation view of a vehicle according to the present technology.
Figure 2:
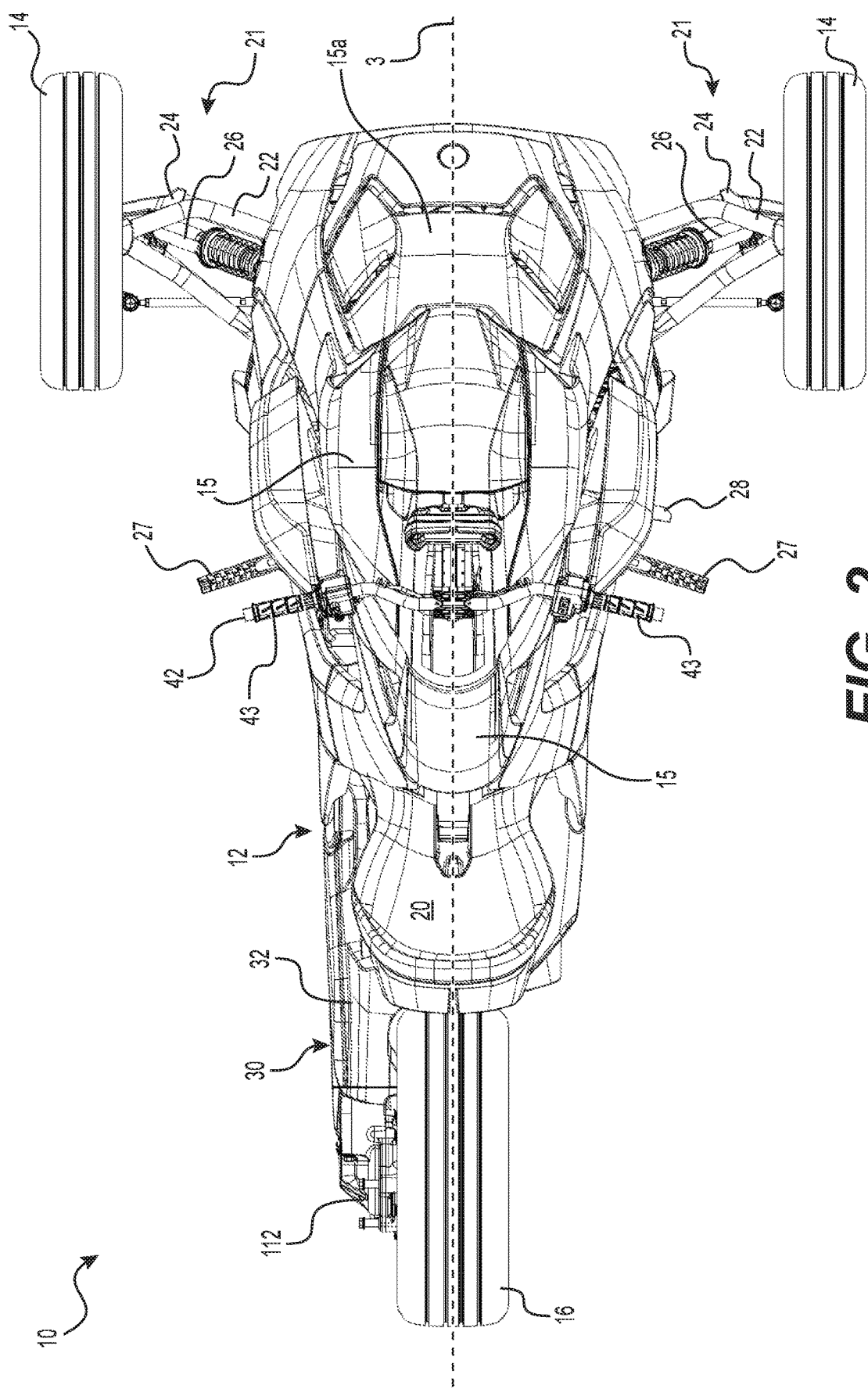
FIG. 2 is a top plan view of the vehicle of FIG. 1.

With reference to FIGS. 1 and 2, a vehicle 10 has a front end 2, a rear end 4, and a longitudinal centerplane 3 defined consistently with the forward travel direction of the vehicle 10. The vehicle 10 has a frame 12 on which various components of the vehicle 10 are supported.

The vehicle 10 is a three-wheeled vehicle including a left front wheel 14 mounted to the frame 12 by a left front suspension assembly 21 and a right front wheel 14 mounted to the frame 12 by a right front suspension assembly 21. The vehicle 10 also comprises single rear wheel 16 supported by a rear suspension assembly 30 of the vehicle 10. The left and right front wheels 14 and the rear wheel 16 each have a tire secured thereto. The front wheels 14 are disposed equidistant from the longitudinal centerplane 3, and the rear wheel 16 is centered with respect to the longitudinal centerplane 3. It is contemplated that aspects of the present technology could also be implemented on a vehicle with two rear wheels 16 and a single, centered front wheel 14.

Figure 4:
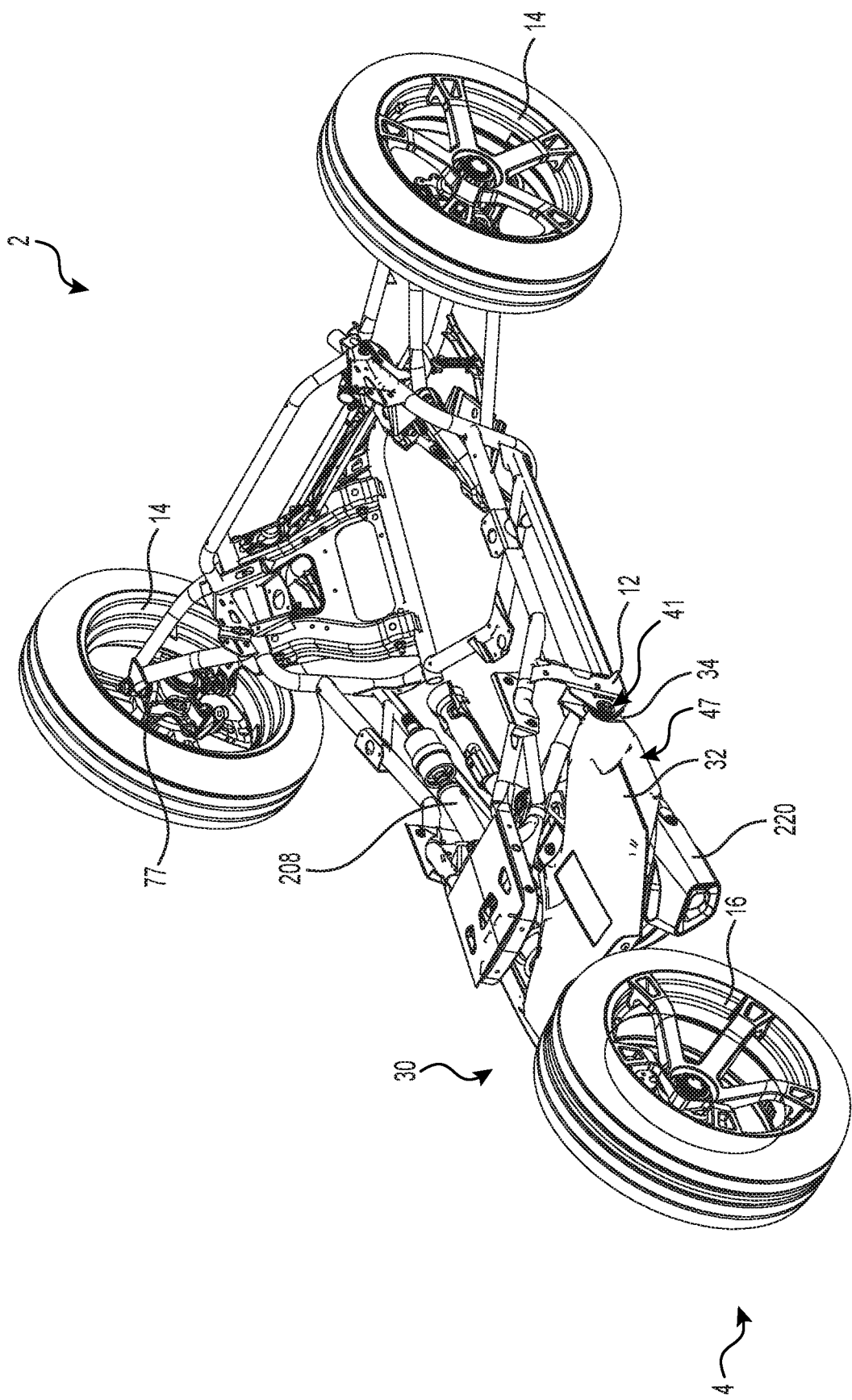
FIG. 4 is a rear, right side perspective view of the vehicle of FIG. 1 with certain components removed to expose part of a frame and a rear suspension assembly of the vehicle of FIG. 1.
Figure 5:
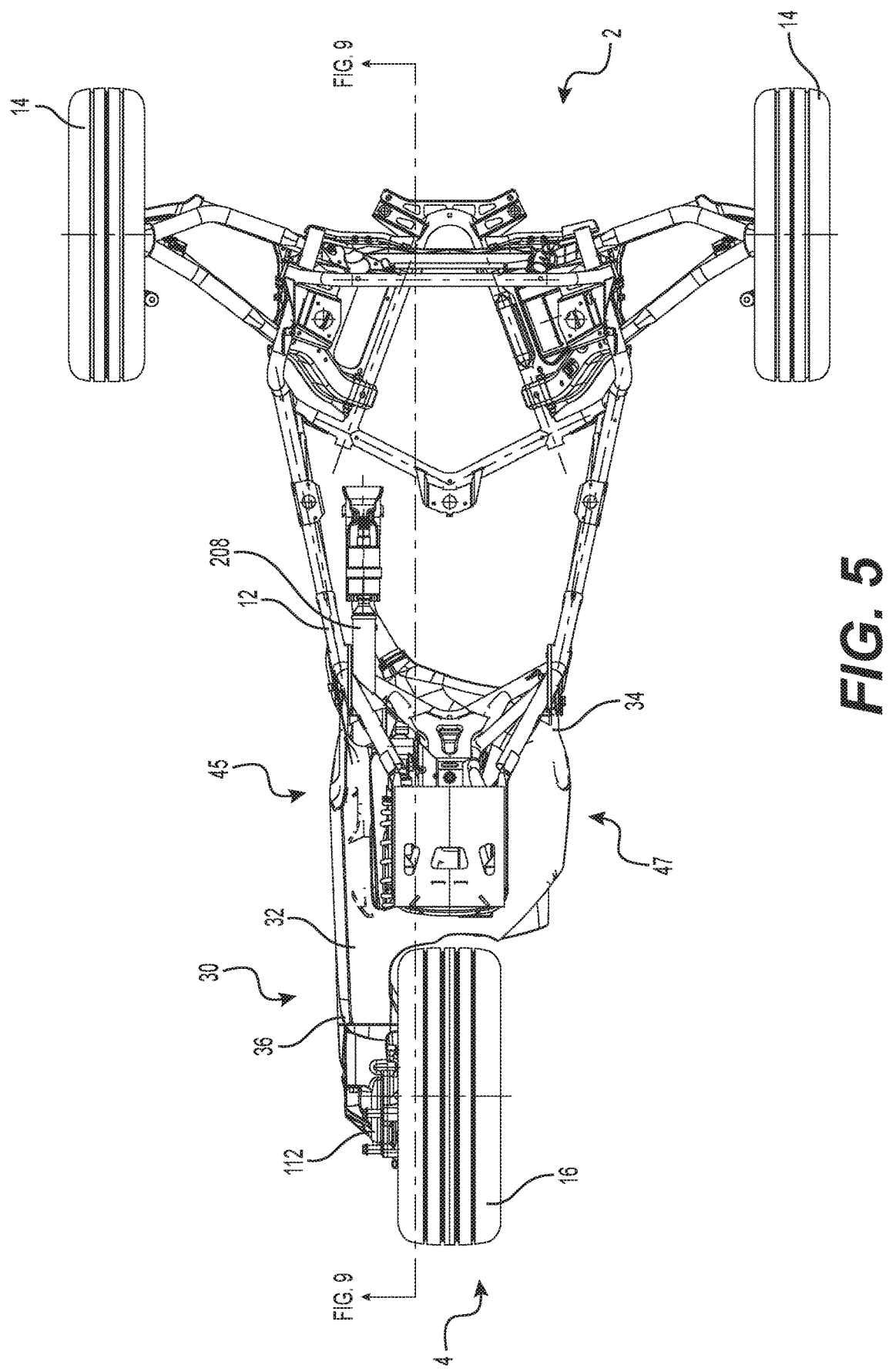
FIGS. 5 and 6 are top and bottom plan views respectively of the vehicle as shown in FIG. 4.
Figure 6:
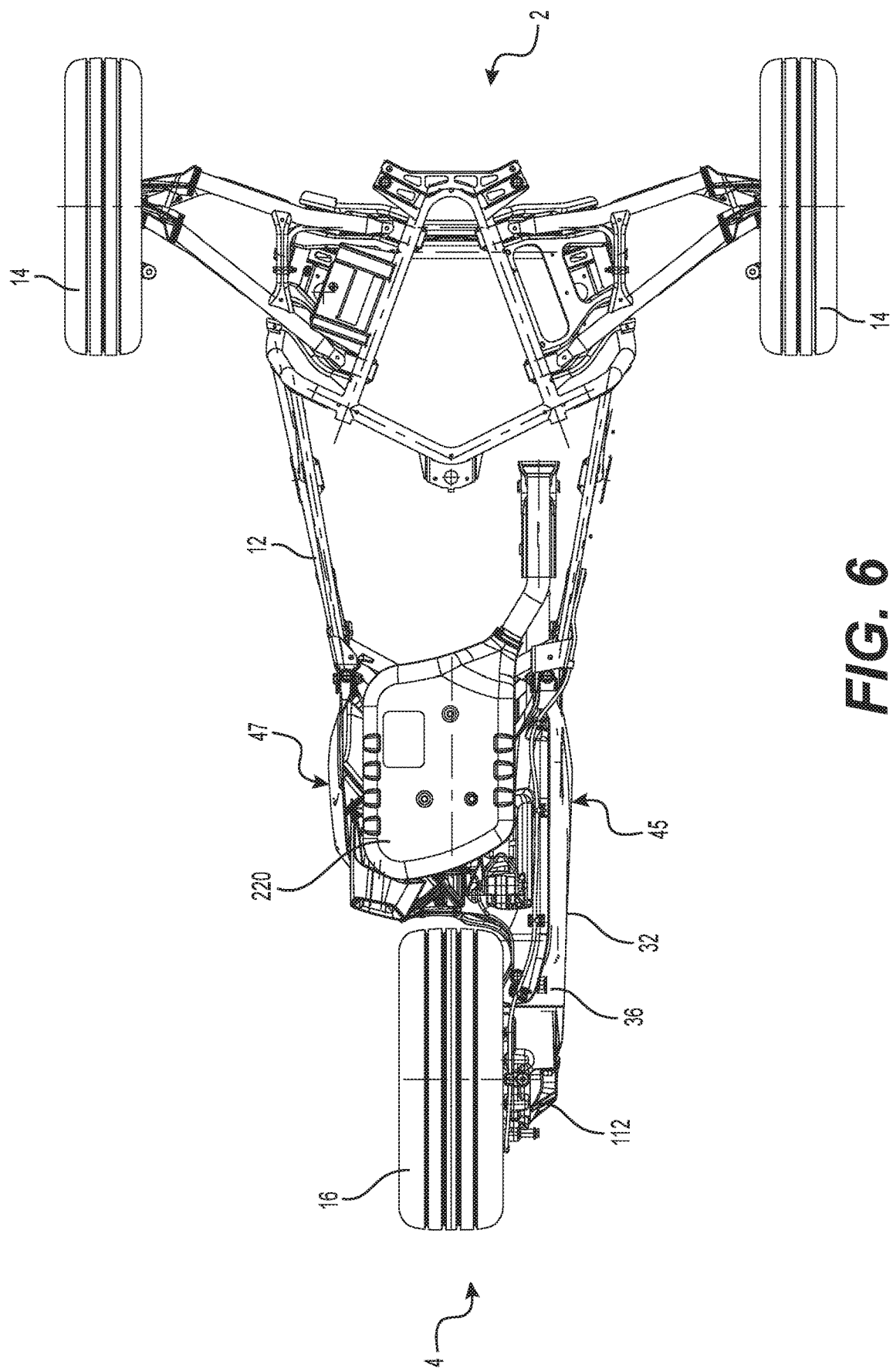
Figure 7:
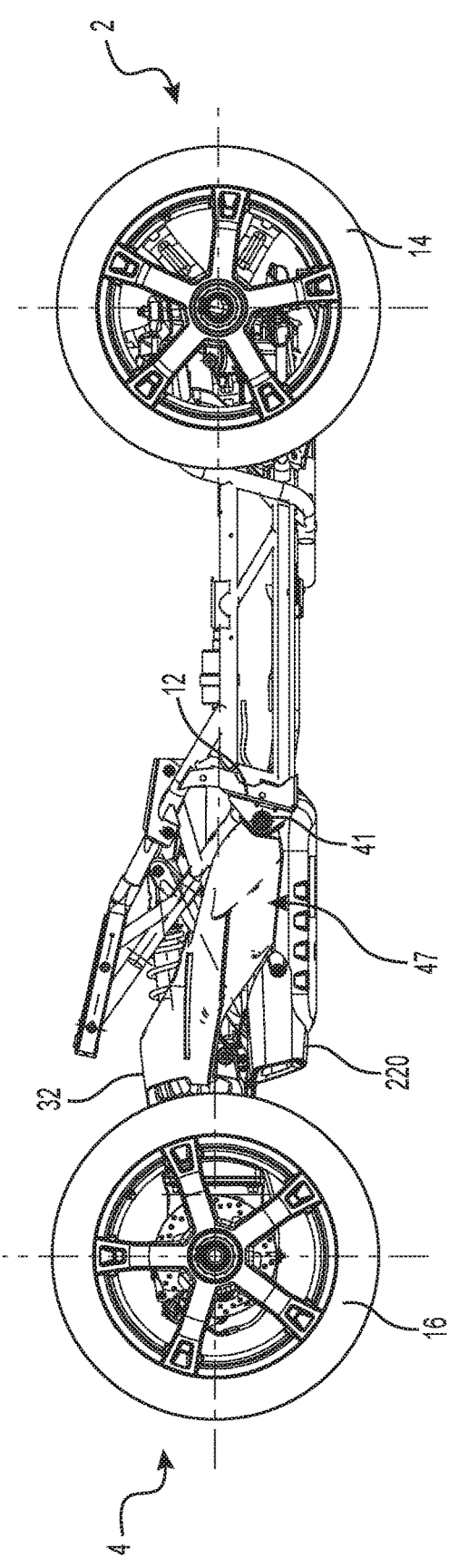
FIGS. 7 and 8 are right and left side elevation views respectively of the vehicle as shown in FIG. 4.
Figure 8:
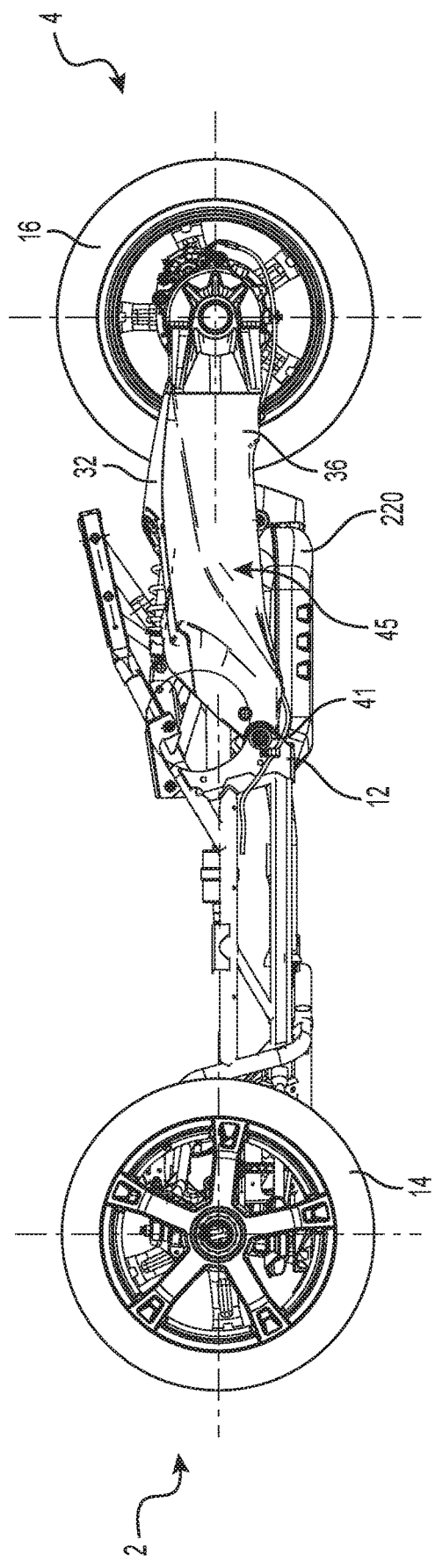
Figure 9:
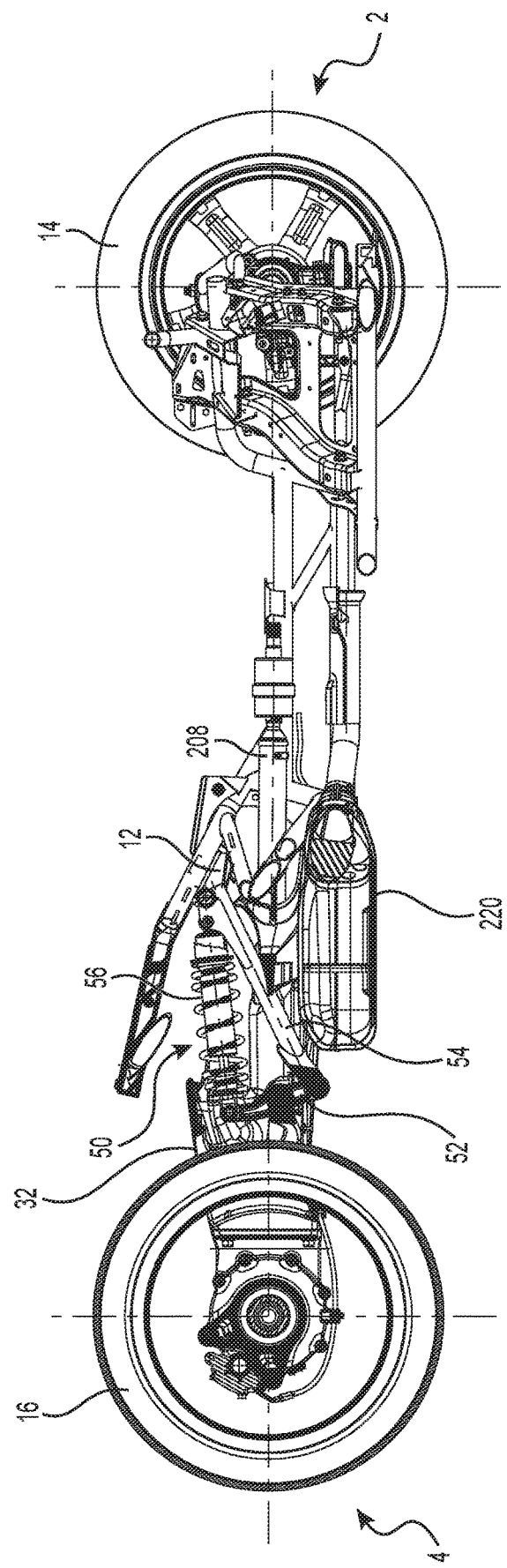
FIG. 9 is a cross-sectional view of the vehicle as indicated in FIG. 5.
Figure 10:
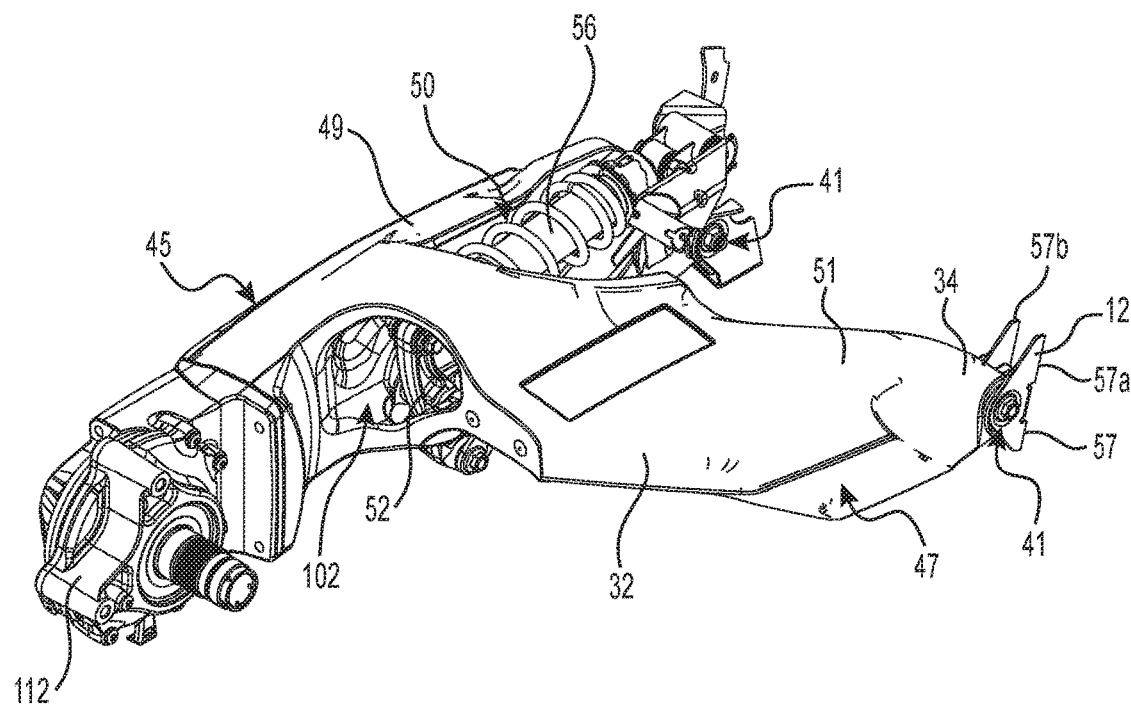
FIG. 10 is a rear, right side perspective view of the rear suspension assembly of the vehicle of FIG. 1.

In the illustrated implementation and as can be seen in FIGS. 2 and 4, each front suspension assembly 21 is a double A-arm type suspension, also known as a double wishbone suspension. It is contemplated that other types of suspensions, such as a McPherson strut suspension, or a swing arm suspension could be used. Each front suspension assembly 21 includes an upper A-arm 22, a lower A-arm 24 and a shock absorber 26. The right front suspension assembly 21 is a mirror image of the left front suspension assembly 21, and as such only the left front suspension assembly 21 will be described herein. Each A-arm 22, 24 has a front member and a rear member. The laterally outer ends of the front and rear members are connected to each other while the laterally inner ends of the front and rear members of each A-arm 22, 24 are spaced apart from each other.

The lower end of the shock absorber 26 is connected to the front and rear members of the lower A-arm 24 slightly laterally inward of the laterally outer ends. The laterally inner ends of the upper and lower A-arms 22, 24 are pivotally connected to the frame 12. As can be seen in FIG. 4, the laterally outer ends of the upper and lower A-arms 22, 24 are pivotally connected to the top and bottom respectively of a knuckle 77. The front wheel 14 is connected to a spindle that is connected to the knuckle 77.

As shown in FIG. 4, the rear suspension assembly 30 comprises a swing arm 32 that is pivotally mounted at a proximal end 34 thereof to the frame 12. The rear wheel 16 is rotatably mounted to a distal end 36 of the swing arm 32 which extends on a left side of the rear wheel 16. More specifically, the rear wheel 16 is rotatable about a wheel rotation axis 110 via a final drive unit 112 affixed (e.g., fastened) to the distal end 36 of the swing arm 32 that receives the distal end of a driveshaft 208 (see FIG. 4) and the gears associated therewith for providing motive power to the rear wheel 16. With reference to FIGS. 3, 4, 17 and 18, the driveshaft 208 extends from the power pack 190 to the final drive unit 112, passing in part through the swing arm 32. As will be described in more detail below, the rear suspension assembly 30 comprises a linkage subassembly connected between the swing arm 32 and the frame 12.

The vehicle 10 has a straddle seat 20 mounted to the frame 12 and disposed along the longitudinal centerplane 3. In the illustrated implementation, the straddle seat 20 is intended to accommodate a single adult-sized rider, i.e. the driver. It is however contemplated that a passenger seat portion could be connected to the frame 12 in order to accommodate a passenger behind the driver.

A driver footrest 27 is disposed on either side of the vehicle 10 and vertically lower than the straddle seat 20 to support the driver's feet (see FIGS. 1 and 2). The driver footrests 27 are connected to the frame 12. In the implementation of the vehicle 10 illustrated herein, the driver footrests 27 are in the form of foot pegs disposed longitudinally forward of the straddle seat 20. It is also contemplated that the footrests 27 could be in the form of footboards. It is contemplated that the vehicle 10 could also be provided with one or more passenger footrests disposed rearward of the driver footrest 27 on each side of the vehicle 10, for supporting a passenger's feet when a passenger seat portion for accommodating a passenger is connected to the vehicle 10. A brake pedal 28 is connected to the right driver footrest 27 for braking the vehicle 10. The brake pedal 28 extends upwardly and forwardly from the right driver footrest 27 such that the driver can actuate the brake pedal 28 with a front portion of the right foot while a rear portion of the right foot remains on the right driver footrest 27.

The vehicle 10 includes a steering assembly 40. A handlebar 42, which is part of the steering assembly 40, is disposed in front of the seat 20. The handlebar 42 is used by the driver to turn the front wheels 14 to steer the vehicle 10. A left hand grip 43 is placed around the left side of the handlebar 42 near the left end thereof and a right hand grip 43 is placed around the right side of the handlebar 42 near the right end to facilitate gripping for turning the handlebar 42 and thereby steering the vehicle 10. The right hand grip 43 provides twist-grip type throttle control. It is contemplated that the brake pedal 28 could be positioned on the opposite lateral side of the vehicle 10 or replaced with a brake lever at either the left or right hand grips 43.

A central portion of the handlebar 42 is connected to an upper end of a steering column (not shown). From the handlebar 42, the steering column 44 extends downwardly and leftwardly. The steering column is rotatably supported by the frame 12. A bottom portion of the steering column is operatively connected to the front wheels 14 for steering the vehicle 10. In implementations of a vehicle having a single front wheel, the steering column could be differently implemented, for example in the form of a triple clamp.

Figure 3:
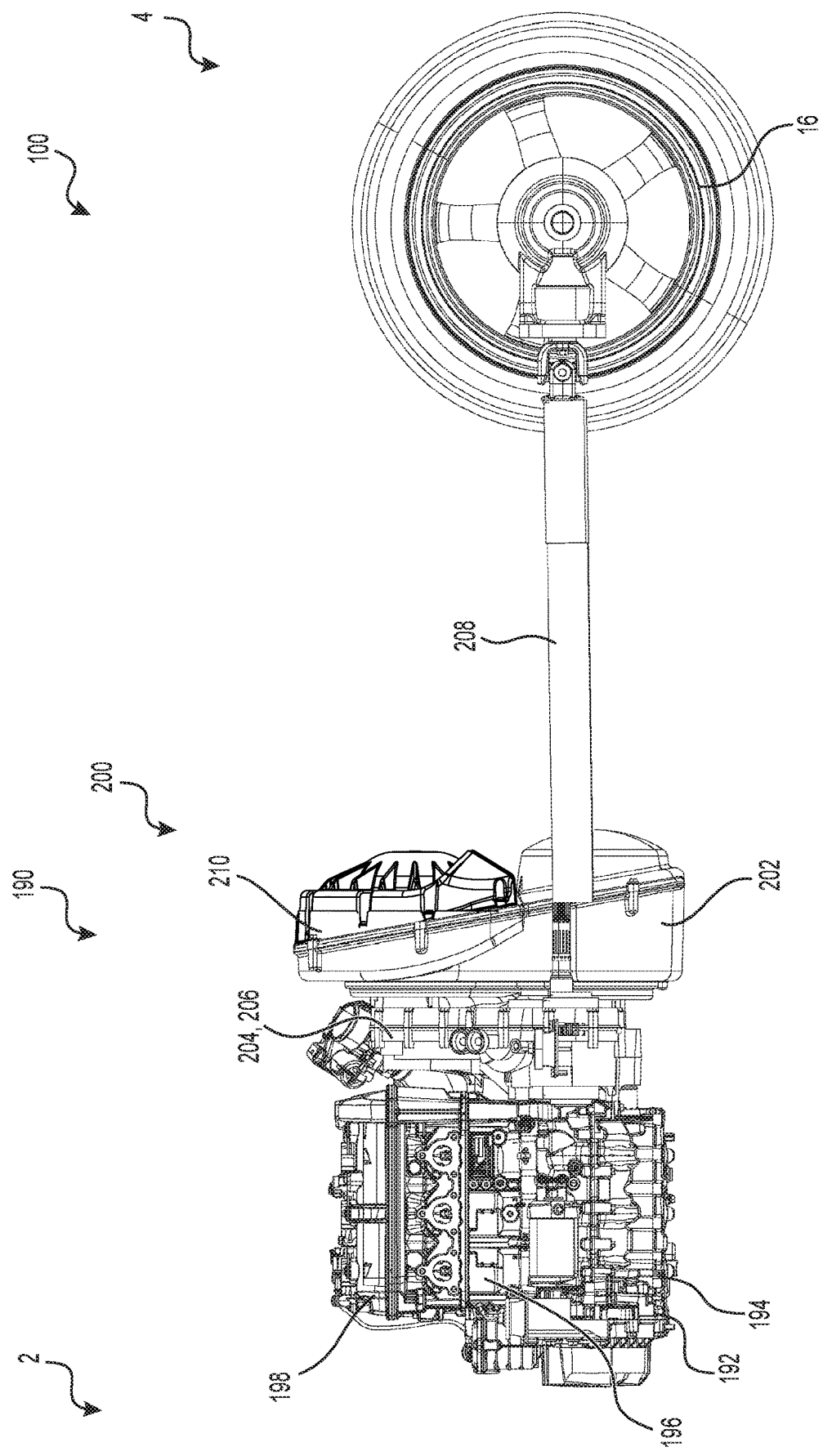
FIG. 3 is a left side elevation view of a portion of a powertrain and a rear wheel of the vehicle of FIG. 1.

As can be seen in FIGS. 1 and 3, the vehicle 10 includes a power pack 190, including a motor 192 and a transmission assembly 200. The transmission assembly 200 includes a continuously variable transmission (CVT) 202 and a transfer case 204 in the present implementation. The power pack 190 is supported by the frame 12. In the illustrated implementation of the vehicle 10, the motor 192 is in the form of an internal combustion engine. It is however contemplated that the motor 192 could be other than an internal combustion engine, for example an electric motor, a hybrid or the like. The motor 192 will be referred to hereinafter as engine 192 for convenience. The engine 192 is operatively connected to the rear wheel 16 to drive the rear wheel 16.

As can be seen in FIG. 3, the engine 192 has a crankcase 194, a cylinder block 196 disposed on and connected to the crankcase 194, and a cylinder head assembly 198 disposed on and connected to the cylinder block 196. Further detail regarding engines, such as the engine 192, can be found in U.S. Pat. No. 8,393,306 B2, issued on Mar. 12, 2013, the entirety of which is incorporated herein by reference.

The rear wheel 16 is operatively connected to a crankshaft (not shown) of the engine 192 via an engine output shaft (not shown), the CVT 202, the transfer case 204 and the driveshaft 208. It is contemplated that the engine 192 could be connected to the front wheels 14 instead of, or in addition to, the rear wheel 16. The engine 192, the CVT 202, the transfer case 204 and the driveshaft 208 form part of a vehicle powertrain 100. Power produced by the engine 192 is transmitted to the CVT 202, then to the transfer case 204, which in turn drives the driveshaft 208 to turn the rear wheel 16.

As can be seen in FIG. 3, the transfer case 204 is disposed rearward of the engine 192. The transfer case 204 includes a transfer case housing 206 which is mounted to the rear end of the engine 192 via the cylinder block 196 and the crankcase 194. The CVT 202 is disposed rearward of the transfer case 204 and includes a CVT housing 210. It is contemplated that the vehicle 10 could have a transmission assembly 200 in which the CVT 202 and the transfer case 204 are replaced by a discrete gear transmission or another type of manual, semi-automatic or automatic transmissions.

A front end of the driveshaft 208 is enclosed by the transfer case housing 206. The driveshaft 208 extends longitudinally and rearwardly out of the transfer case housing 206 on a left side of the longitudinal centerplane 3. The rear end of the driveshaft 208 is operatively connected to the rear wheel 16 (via the final drive unit 112) to drive the rear wheel 16 without inhibiting motion of the rear wheel 16 about the rear suspension assembly 30 as the vehicle 10 moves over uneven terrain. It is contemplated that the driveshaft 208 could be omitted and the transfer case 204 could be connected to the rear wheel 16 via a chain, belt, or other transmission assembly instead of the driveshaft 208.

Turning back to FIGS. 1 and 2, the vehicle 10 includes body panels 15 which are connected to and supported by the frame 12. The body panels 15 enclose and protect the internal components of the vehicle 10 such as the engine 192. The body panels 15 include a hood 15a disposed at the front of the vehicle 10 between the front wheels 14. The vehicle 10 also includes headlights 25 connected to and supported by the frame 12.

As can be seen in FIG. 1, a fuel tank 212 disposed behind the CVT 202 supplies fuel to the engine 192. The straddle seat 20 is disposed longitudinally rearward of the fuel tank 212. The fuel tank 212 is connected to and supported by the frame 12. The fuel tank 212 includes a fuel filler neck opening.

As can be seen in FIGS. 1, 4, and 6 to 9, the vehicle 10 also includes an exhaust system fluidly connected to the engine 192, which includes a muffler 220. The engine 192 is fluidly connected to an exhaust manifold and an exhaust conduit (not shown) extending longitudinally and rearwardly from the engine 192. The exhaust conduit fluidly connects to the muffler 220 disposed generally below the seat 20. In the illustrated implementation, the muffler 220 is laterally centered with respect to the longitudinal centerplane 3. The muffler 220 is fastened to a muffler bracket of the frame 12. It is however contemplated that the muffler 220 could not be aligned with the seat 20 in the lateral and/or longitudinal directions. It is contemplated that the muffler 220 could not be laterally centered with respect to the longitudinal centerplane 3.

With reference to FIG. 1, each of the two front wheels 14 and the rear wheel 16 is provided with a brake assembly 90. The brake assemblies 90 of the three wheels 14, 16 form a brake system 92. Each brake assembly 90 is a disc-type brake mounted onto the spindle of the respective wheel 14 or 16. Other types of brakes are contemplated. Each brake assembly 90 includes a rotor 94 mounted onto the final drive unit 112 and a stationary caliper 96 straddling the rotor 94. The brake pads (not shown) are mounted to the caliper 96 so as to be disposed between the rotor 94 and the caliper 96 on either side of the rotor 94. The brake pedal 28 is operatively connected to the brake assemblies 90 provided on each of the two front wheels 14 and the rear wheel 16.

The configuration of the rear suspension assembly 30 and the manner in which it operates will now be described in more detail with reference to FIGS. 4 to 18.

Figure 11:
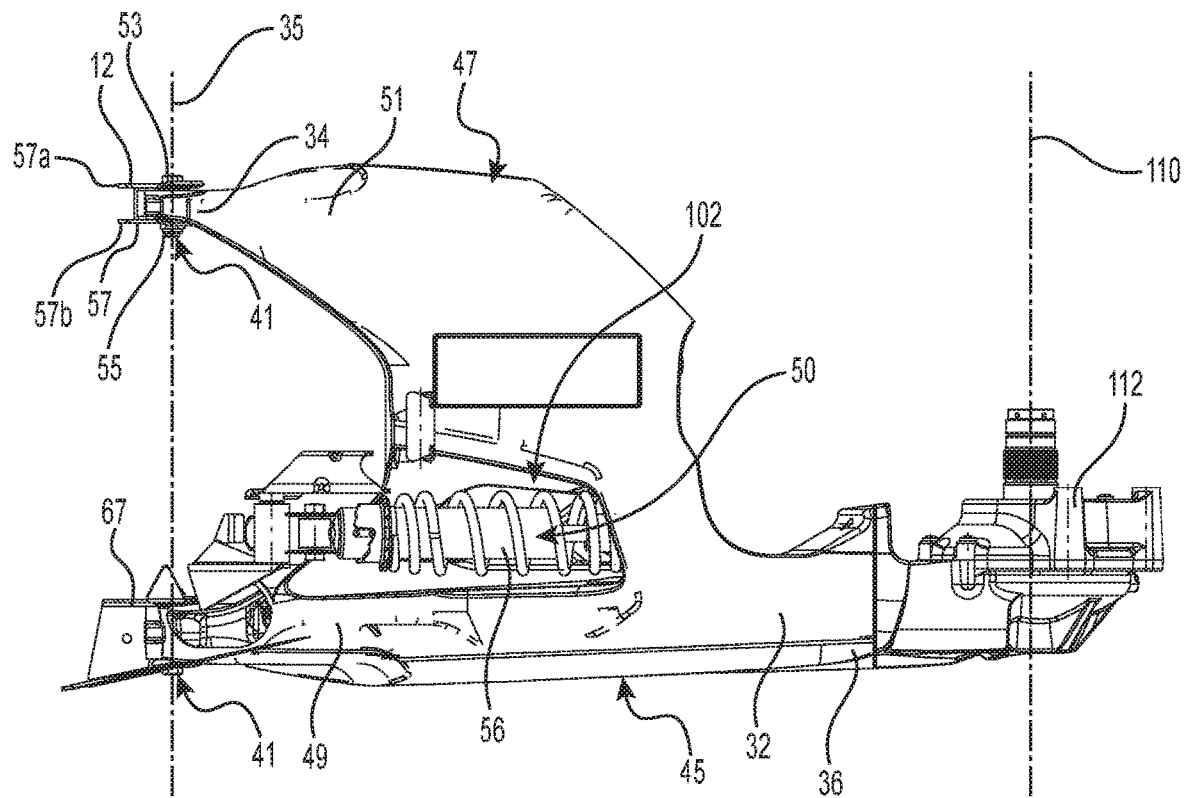
FIG. 11 is a top plan view of the rear suspension assembly of FIG. 10.
Figure 12:
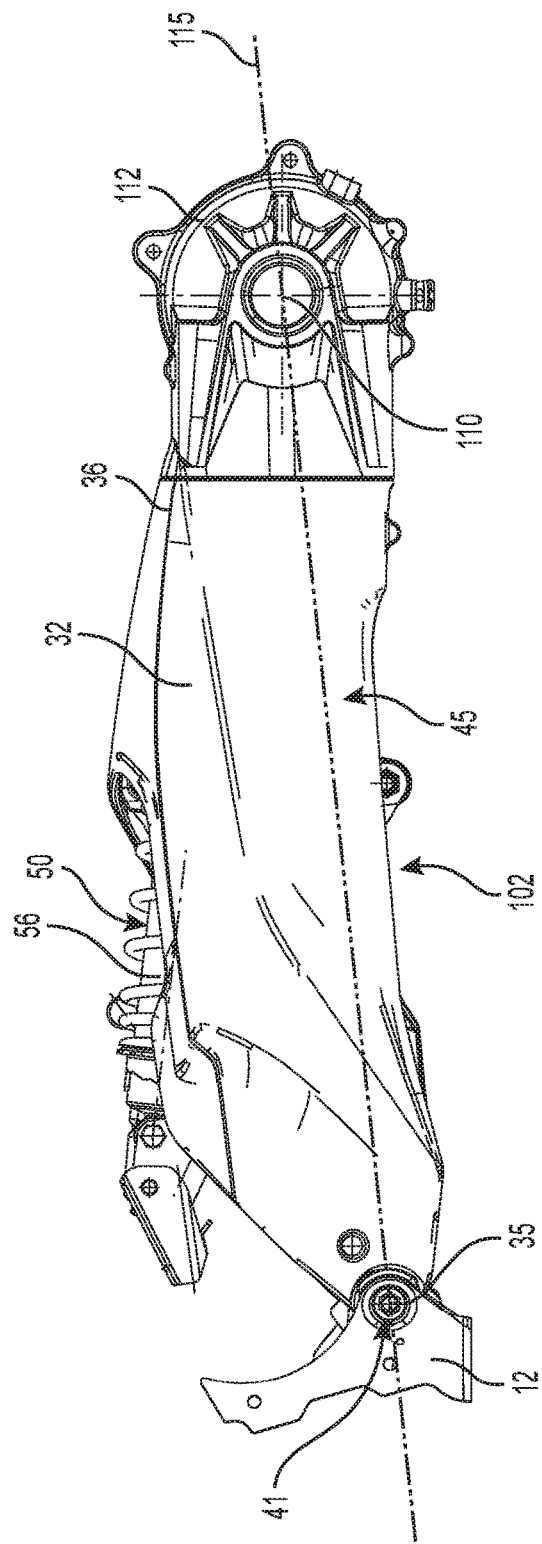
FIGS. 12 and 13 are right and left side elevation views respectively of the rear suspension assembly of FIG. 10.
Figure 13:
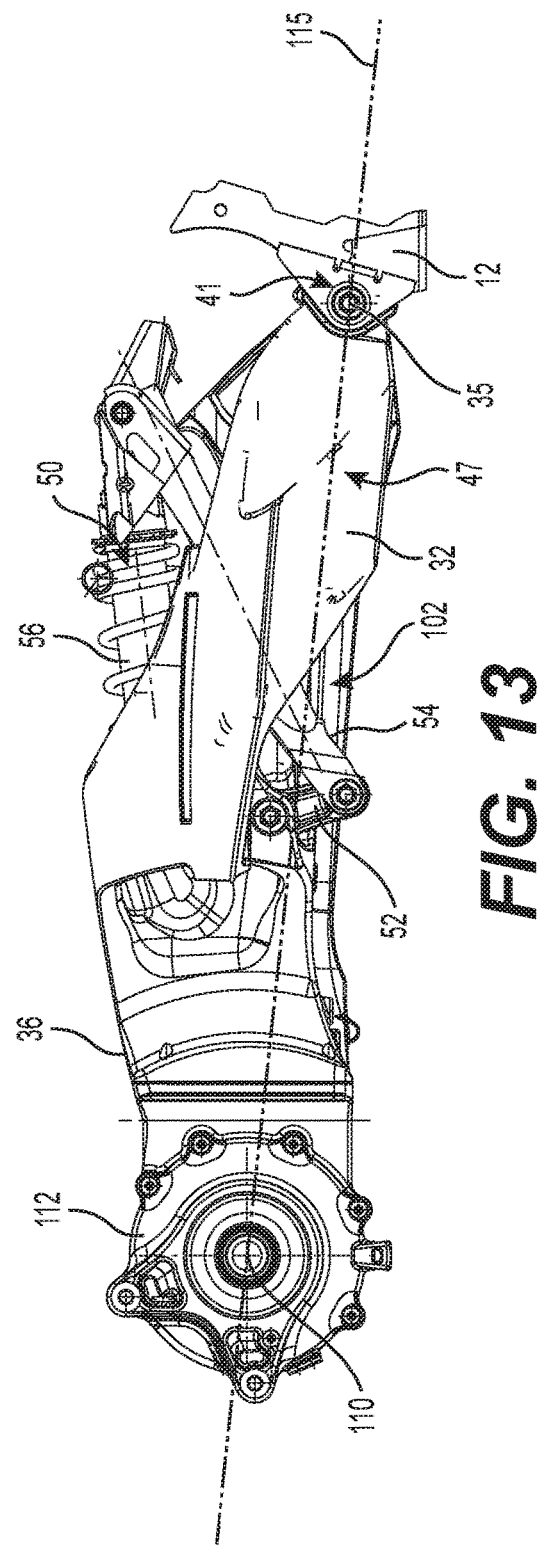

The swing arm 32 of the rear suspension assembly 30 is pivotally connected at its proximal end 34 to the frame 12 about a swing arm pivot axis 35 that extends laterally. More specifically, the swing arm 32 comprises a pair of swing arm extensions 49, 51 that are each pivotally connected to the frame 12 via a respective swing arm pivot 41 to define the swing arm pivot axis 35. The swing arm extensions 49, 51 are disposed on left and right lateral sides 45, 47 of the swing arm 32 respectively. The swing arm pivots 41 may be configured in any suitable way. For example, with reference to FIGS. 10 and 11, in this implementation, a bracket 57 of the frame 12 receives a portion of the swing arm extension 51 between two flanges 57a, 57b of the bracket 57. A fastener 53 (e.g., a bolt) extends through the flanges 57a, 57b and the swing arm extension 51 and a fastener retaining member 55 (e.g., a nut) secures the fastener 53 in place. As shown in FIG. 11, the swing arm extension 49 is similarly connected to a bracket 67 of the frame 12. The swing arm 32 of the illustrated implementation is a mono swing arm, or single sided swing arm, which extends along and connects, via the final drive unit 112, to only one side of the rear wheel 16, although other types of swing arms are contemplated.

The linkage subassembly 50 of the rear suspension assembly 30 is connected between the frame 12 and the swing arm 32. The linkage subassembly 50 comprises three members (which may be thought of as "links") including a rocker link 52, a linking arm 54 and a shock absorber 56 which, in a manner that will be explained in detail below, work together to control movement of the swing arm 32 relative to the frame 12 of the vehicle 10.

Figure 14:
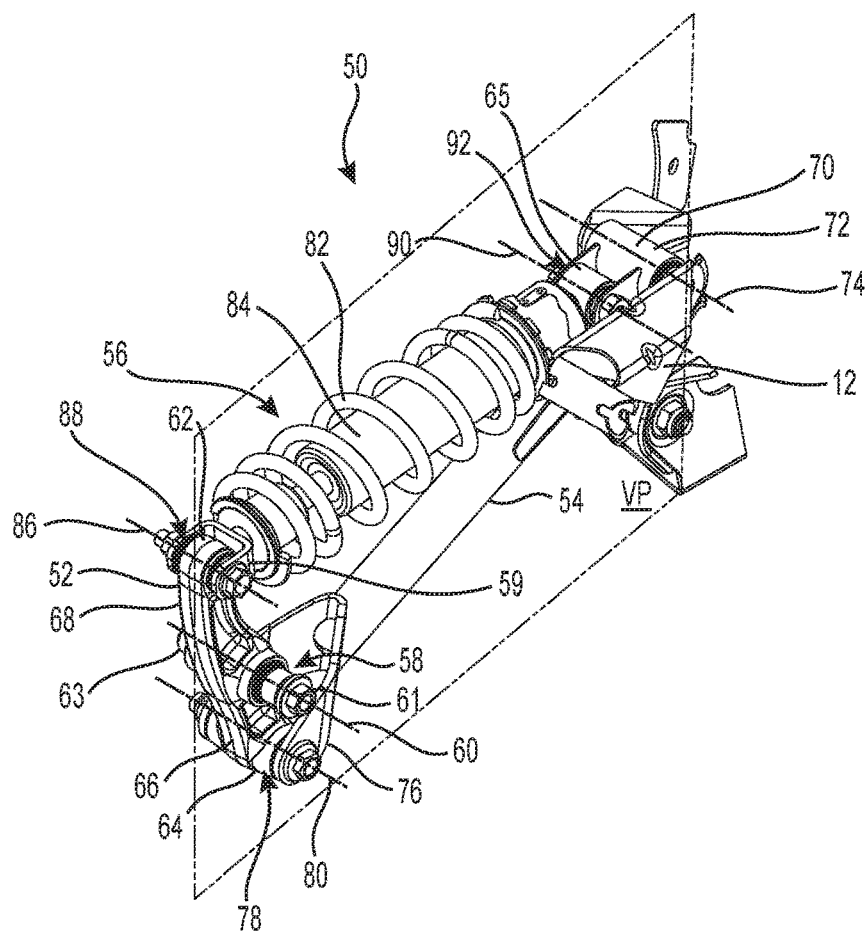
FIG. 14 is a rear, right side perspective view of a linkage subassembly of the rear suspension assembly.
Figure 15:
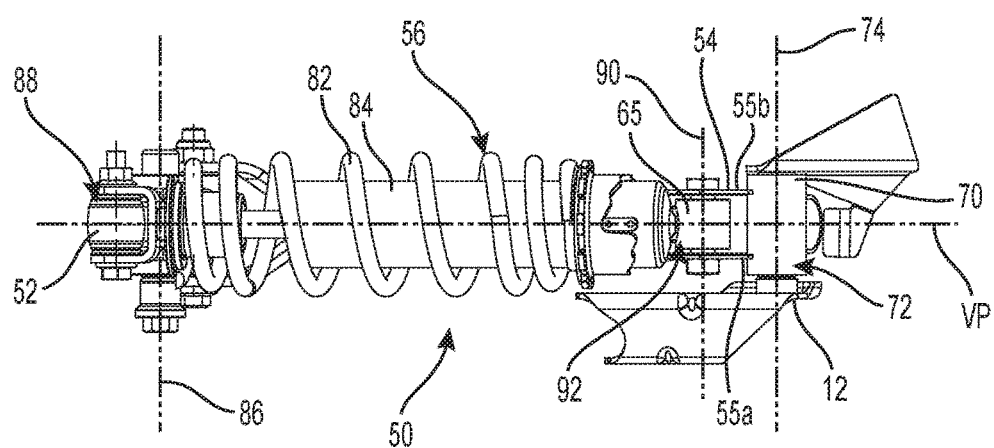
FIG. 15 is a top plan view of the linkage subassembly of FIG. 14.
Figure 16:
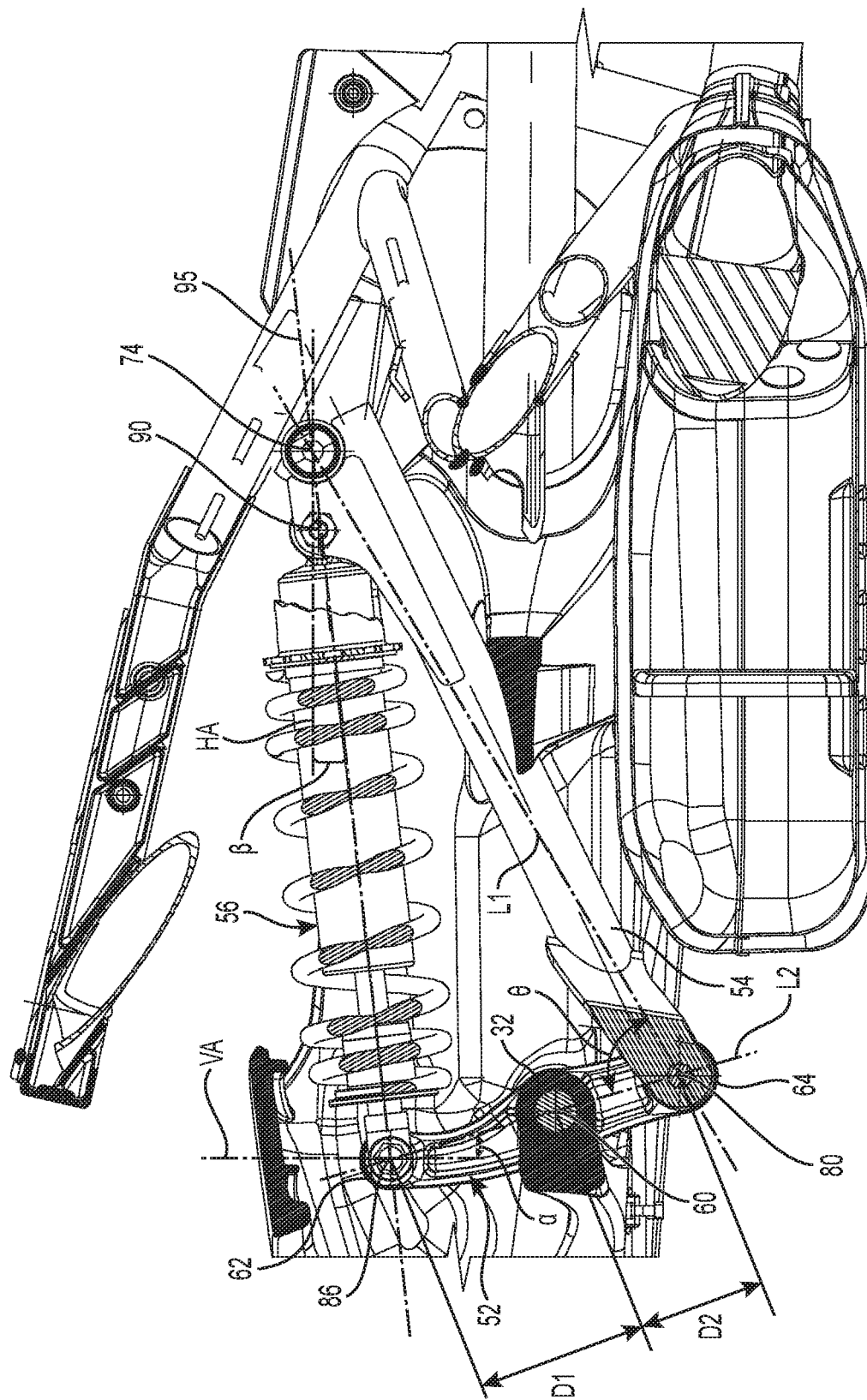
FIG. 16 is a detail view of a portion of the cross-sectional view of the vehicle shown in FIG. 9.

As best seen in FIGS. 14 to 16, the rocker link 52 is pivotally connected to the swing arm 32 about a rocker link pivot axis 60 that extends laterally and is defined by a rocker link pivot 58. The rocker link pivot 58 is located away from ends 62, 64 of the rocker link 52 such that the rocker link 52 has a first portion 66 and a second portion 68 which extend in divergent (e.g., opposite) directions from the rocker link pivot 58. The rocker link pivot 58 may be configured in any suitable way. For example, in this implementation, an opening of the rocker link 52 is configured to receive a fastener 61 (e.g., a bolt) that also engages an opening of the swing arm 32 such that the rocker link 52 can pivot about the rocker link pivot axis 60. The fastener 61 is secured in place by a corresponding fastener receiving member 63 (e.g., a nut). The rocker link pivot 58 may be established in any other suitable way in other implementations. For instance, any other securing element may be used instead of a fastener (e.g., a pin). It is also contemplated that the rocker link pivot 58 could have a bearing to facilitate the pivoting motion of the rocker link 52 relative to the swing arm 32.

Figure 17:
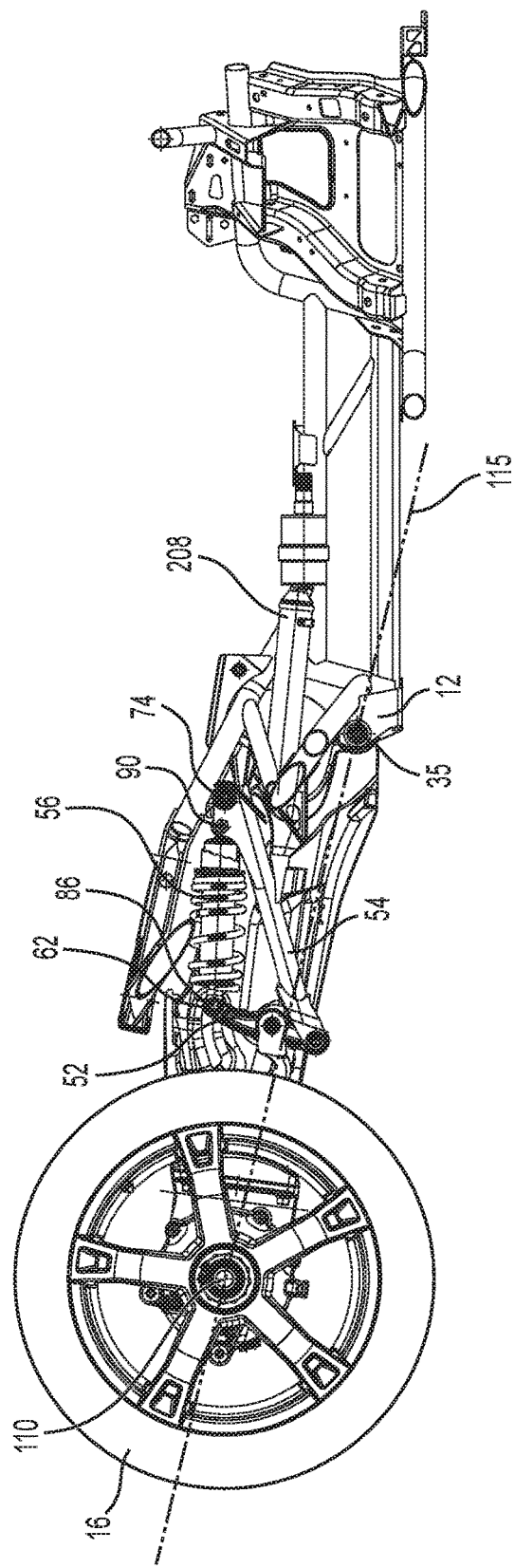
FIG. 17 is a cross-sectional right side elevation view of the vehicle as shown in FIG. 4 showing the rear suspension assembly in a full bump state.
Figure 18:
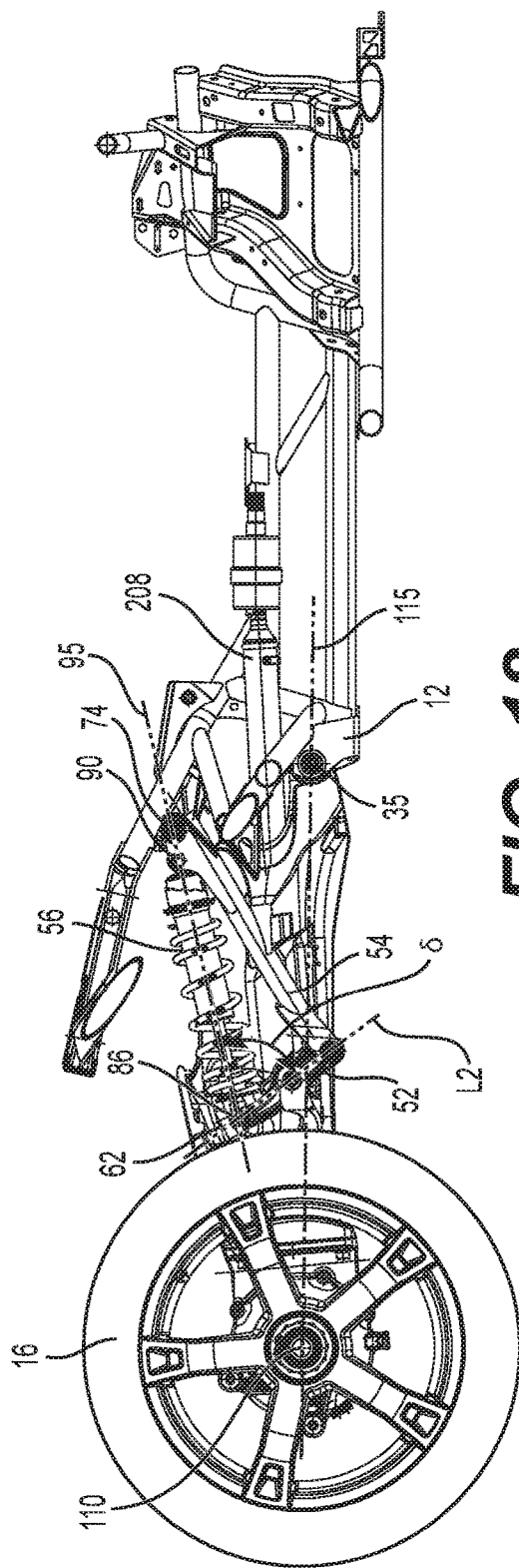
FIG. 18 is a cross-sectional right side elevation view of the vehicle as shown in FIG. 4 showing the rear suspension assembly in a full droop state.

The linking arm 54 is pivotally connected to the frame 12 and to the rocker link 52. More specifically, an end portion 70 of the linking arm 54 is pivotally connected to the frame 12 about a linking arm pivot axis 74 that extends laterally. As best seen in FIGS. 17 and 18, in this implementation, the linking arm pivot axis 74 is vertically higher than the swing arm pivot axis 35. Moreover, the linking arm 54 is positioned, vertically, between the muffler 220 and the shock absorber 56 thus separating the muffler 220 from the shock absorber 56. This may protect the shock absorber 56 from the heat emanated by the muffler 220. An opposite end portion 76 of the linking arm 54 is pivotally connected to the first portion 66 of the rocker link 52 about a linking arm pivot axis 80 that extends laterally. The linking arm pivot axes 74, 80 are defined by linking arm pivots 72, 78 respectively. The linking arm pivots 72, 78 may be configured in any suitable manner. For instance, in this example, the end portion 70 of the linking arm 54 is positioned between two portions of the frame 12 and a fastener (such as the fastener 61) extends through the frame 12 and the end portion 70 to establish the linking arm pivot 72. The fastener is secured in place by a fastener receiving member (e.g., a nut). Moreover, in this example, the end portion 76 of the linking arm 54 is formed as a clevis which receives the end 64 of the rocker link 52 therebetween. A fastener (such as the fastener 61) extends through the clevis of the end portion 76 and engages a corresponding opening in the rocker link 52 to establish the linking arm pivot 78. The fastener is secured in place by a fastener receiving member (e.g., a nut).

The shock absorber 56 is configured to provide shock absorption to the rear suspension assembly 30. To that end, the shock absorber 56 comprises a spring 82 and a damper 84 mounted coaxially to one another. In this implementation, the spring 82 has a constant spring rate such that the spring 82 is configured to deflect a same amount for a given force throughout its range of deflection.

The shock absorber 56 is pivotally connected to the rocker link 52 and to at least one of the linking arm 54 and the frame 12. More particularly, in this implementation, an end portion 59 of the shock absorber 56 is pivotally connected to the second portion 68 of the rocker link 52 about a shock absorber pivot axis 86 that extends laterally. The shock absorber pivot axis 86 is defined by a shock absorber pivot 88 established between the rocker link 52 and the shock absorber 56. The shock absorber pivot 88 may be configured in any suitable way. For instance, with reference to FIG. 15, in this example, the end portion 59 of the shock absorber 56 constitutes a clevis end which receives the end 62 of the rocker link 52. A fastener (such as the fastener 61) is inserted through the clevis end of the shock absorber 56 and the end 62 of the rocker link 52. The fastener is secured in place by a fastener receiving member (e.g., a nut). The shock absorber pivot 88 may be configured in any other suitable way in other implementations.

In this implementation, an opposite end portion 65 of the shock absorber 56 is pivotally connected to the linking arm 54 about a shock absorber pivot axis 90 that extends laterally. As such, the shock absorber pivot axis 90 is offset from the linking arm pivot axis 74. The shock absorber pivot axis 90 is defined by a shock absorber pivot 92 established between the shock absorber 56 and the linking arm 54. The shock absorber pivot 92 may be configured in any suitable way. For instance, in this example, the end portion 65 of the shock absorber 56 is positioned between a pair of flanges 55a, 55b of the linking arm 54. A fastener (such as the fastener 61) is inserted through a mounting hole of the end portion 65 and through corresponding holes in the flanges 55a, 55b. The fastener is secured in place by a fastener receiving member (e.g., a nut). The shock absorber pivot 92 may be configured in any other suitable way in other implementations.

Thus, when the swing arm 32 pivots upwardly with respect to the frame 12 (e.g., when the rear wheel 16 climbs over an obstacle in its path), the linking arm 54 causes the rocker link 52 to pivot about the rocker link pivot axis 60 such that the end 62 of the rocker link 52 moves forwardly with respect to the swing arm 32. This causes compression of the shock absorber 56 as a distance between the shock absorber pivot axes 86, 90 decreases. For example, FIG. 17 illustrates such a movement of the swing arm 32 and the linkage subassembly 50. In particular, FIG. 17 shows the suspension assembly 30 in a "full bump" state in which the shock absorber 56 is compressed at its maximum (i.e., the distance between the shock absorber pivot axes 86, 90 is at its minimum). By way of contrast, FIGS. 4 to 9 show the suspension assembly 30 in a "driver loaded" state in which an average driver is seated on the vehicle 10 with the vehicle 10 at rest on level ground.

On the other hand, when the swing arm 32 pivots downwardly with respect to the frame 12 (e.g., when the rear wheel 16 encounters a depression in its path), the linking arm 54 causes the rocker link 52 to pivot about the rocker link pivot axis 60 such that the upper end 62 of the rocker link 52 moves rearwardly. This causes extension of the shock absorber 56 as the distance between the shock absorber pivot axes 86, 90 increases. For example, FIG. 18 illustrates such a movement of the swing arm 32 and the linkage subassembly 50. In particular, FIG. 18 shows the suspension assembly 30 in a "full droop" state in which the shock absorber 56 is extended at its maximum (i.e., the distance between the shock absorber pivot axes 86, 90 is at its maximum).

As such, the swing arm 32 is capable of pivoting significantly relative to the frame 12 about the swing arm pivot axis 35. For example, in this implementation, the swing arm 32 can pivot a total of 12.5° about the swing arm pivot axis 35 from the full droop state to the full bump state of the suspension assembly 30.

The linkage subassembly 50 may be configured to optimize performance of the shock absorber 56 in a relatively inexpensive manner.

As shown in FIG. 16, a distance D1 between the shock absorber pivot axis 86 and the rocker link pivot axis 60 is different from a distance D2 between the linking arm pivot axis 80 and the rocker link pivot axis 60. More specifically, the distance D1 is greater than the distance D2 such that, for a given rotation of the rocker link 52 about the rocker link pivot axis 60, the upper end 62 of the rocker link 52 moves a greater distance than the lower end 64 of the rocker link 52. Moreover, a distance between the linking arm pivot axes 74, 80 is configured to be greater than a distance between the shock absorber pivot axes 86, 90 in the driver loaded state.

Furthermore, an angle θ formed between the rocker link 52 and the linking arm 54 is configured to be relatively small. More specifically, the angle θ is formed between a line L1 and a line L2 which respectively extend between (i) the linking arm pivot axes 74, 80, and (ii) the linking arm pivot axis 80 and the shock absorber pivot axis 86. The angle θ is no more than 90° (i.e., 90° or less) independently of the load state of the suspension assembly 30. The angle θ is an acute angle in the driver loaded and full bump states of the suspension assembly 30.

Furthermore, as shown in FIG. 18, an angle δ formed between the rocker link 52 and the shock absorber 56 is also configured to be relatively small, in particular in the full droop state of the suspension assembly 30. More specifically, the angle δ is formed between the line L2 and an axis 95 which respectively extend between (i) the linking arm pivot axis 80 and the shock absorber pivot axis 86, and (ii) the shock absorber pivot axes 86, 90. The angle δ is less than 90° (i.e., acute) in the full droop state of the suspension assembly 30.

This geometrical configuration of the linkage subassembly 50 may allow the shock absorber 56 to be compressed at a greater rate than if the shock absorber 56 were affixed directly between the frame 12 and the swing arm 32 as is typically the case in conventional suspension designs. In turn, given the greater rate of compression of the spring 82, the rear suspension assembly 30 exhibits a "rising" spring rate. In other words, as the suspension assembly 30 becomes harder to compress the more it is compressed, it is less likely to bottom out (i.e., travel its maximal compression limit). Thus, while the spring 82 of the shock absorber 56 has a constant (i.e., linear) spring rate, the linkage subassembly 50 behaves as having a spring with nonlinear spring rate that rises as the shock absorber 56 compresses. This may thus afford the benefits of a spring with a nonlinear spring rate (e.g., a progressive rate springs, variable rate springs, dual rate springs, etc.) without the added cost that is associated with such a spring. In addition, in this implementation, the vehicle 10 exhibits a "motion ratio" (i.e., a ratio of the displacement of the shock absorber 56 over the displacement of the rear wheel 16) that is greater than if the shock absorber 56 were affixed directly between the frame 12 and the swing arm 32.

The linkage subassembly 50 is configured to be relatively compact and to keep a center of gravity of the vehicle 10 relatively low.

For example, the shock absorber 56 may extend lower than in conventional suspension assembly designs. This may be achieved for example by ensuring that the linking arm 54 and the shock absorber 56 are mounted to the frame 12 at relatively low points such that the linking arm pivot axes 74, 80 (defined by the pivots 72, 78) and the shock absorber pivot axis 90 (defined by the pivot 92) are positioned relatively close to a lower end of the frame. This may in turn lower a center of gravity of the frame 12. In this implementation, the shock absorber 56 extends generally horizontally in the full bump state of the suspension assembly 30. For instance, as shown in FIG. 16, the axis 95 which extends through the shock absorber pivot axes 86, 90 defines a relatively small angle β with respect to a horizontal axis HA. In the full bump state of the suspension assembly 30, as shown in FIG. 17, the angle may be no more than 30°, in some cases no more than 20°, in some cases no more than 10°, and in some cases even less. In this case, "generally horizontally" refers to the angle being offset no more than 30° from the horizontal axis HA.

Furthermore, the rocker link 52 extends relatively vertical. Notably, in this implementation, the second portion 68 of the rocker link 52 is vertically above the first portion 66 of the rocker link 52. More particularly, independently of the load state of the suspension assembly 30, the line L2 which passes through the shock absorber pivot axis 86 and the linking arm pivot axis 80 extends more vertically than horizontally. That is, as shown in FIG. 16, the line L2 defines an angle α with respect to a vertical axis VA that can be relatively small. The angle α is less than 45° irrespective of the load state of the suspension assembly 30 (i.e., in the full bump, full droop and driver loaded states of the suspension assembly 30). Independent of the load state of the suspension assembly 30, the angle α may be no more than 30°, in some cases no more than 20°, and in some cases even less (e.g., 15°). In this case, "more vertically than horizontally" refers to the angle α between the line L2 and the vertical axis VA being less than 45°.

Moreover, the components of the linkage subassembly 50 are relatively close to one another laterally. Notably, as shown in FIGS. 14 and 15, in this implementation, the rocker link 52, the linking arm 54 and the shock absorber 56 are laterally aligned with one another. More specifically, the rocker link 52, the linking arm 54 and the shock absorber 56 extend through a common vertical plane VP.

In addition, in this implementation, only one of the rocker link 52, the linking arm 54 and the shock absorber 56 is connected to the frame 12. In particular, of the rocker link 52, the linking arm 54 and the shock absorber 56, only the linking arm 54 is connected to the frame 12. This results in a reduction of mount points on the frame 12 which may facilitate assembly of the suspension assembly 30.

In this implementation, as shown in FIG. 16, the axis 95 extending through the shock absorber pivot axes 86, 90 intersects the linking arm pivot axis 74 independently of the load state of the suspension assembly 30. This may minimize bending of the linking arm 54.

In this implementation, the shock absorber 56 is disposed above the linking arm 54. This may be useful to protect the shock absorber 56 from damage by debris incoming from the ground. However, in other implementations, the positions of the shock absorber 56 and the linking arm 54 may be inverted (i.e., the shock absorber 56 may be disposed below the linking arm 54).

With reference to FIGS. 12, 13, 17 and 18, the linking arm 54 extends across a laterally extending plane 115 containing the swing arm pivot axis 35 and the wheel rotation axis 110. That is, the swing arm pivot axis 35 and the wheel rotation axis 110 extend along the plane 115 while the linking arm extends across the plane 115. As shown in FIGS. 17 and 18, the linking arm 54 extends across the plane 115 irrespective of the load state of the suspension assembly 30 (i.e., independent of whether the suspension assembly 30 is in its full bump state, full droop state or driver loaded state).

Given the compact configuration of the linkage subassembly 50, in this implementation, the swing arm 32 at least partially encloses the linkage subassembly 50. More particularly, as seen in FIGS. 10 to 13, the swing arm 32 is hollow and defines a space 102 between its walls in which the linkage subassembly 50 is disposed. In other words, each of the rocker link 52, the linking arm 54 and the shock absorber 56 at least partially extends within the space 102 defined by the swing arm 32.

Moreover, the compact configuration of the linkage subassembly 50 allows the muffler 220 of the exhaust system to be positioned relatively low. Notably, since the linking arm pivot axis 74 is vertically higher than the swing arm pivot axis 35, this allows additional space below the linkage subassembly 50 for the muffler 220. In particular, as shown in FIGS. 6 to 9, the muffler 220 extends below the rocker link 52, the linking arm 54 and the shock absorber 56.

The suspension assembly 30 may be configured differently in other implementations.

Figure 19:
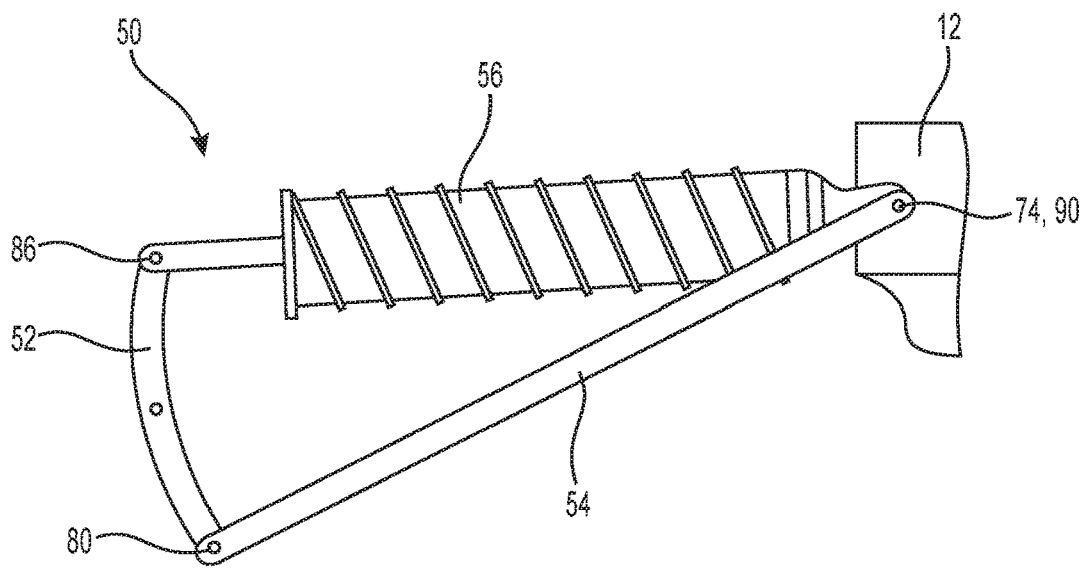
FIGS. 19 and 20 are schematic right side elevation views of alternate implementations of the linkage subassembly of the rear suspension assembly.

For instance, in the implementation shown in FIG. 19, each of the shock absorber 56 and the linking arm 54 is pivotally connected to the frame 12 about a common pivot axis. In other words, in this example, the linking arm pivot axis 74 about which the linking arm 54 is pivotally connected to the frame 12, and the shock absorber pivot axis 90 about which the shock absorber 56 is pivotally connected to the linking arm 54 are coaxial.

Figure 20:
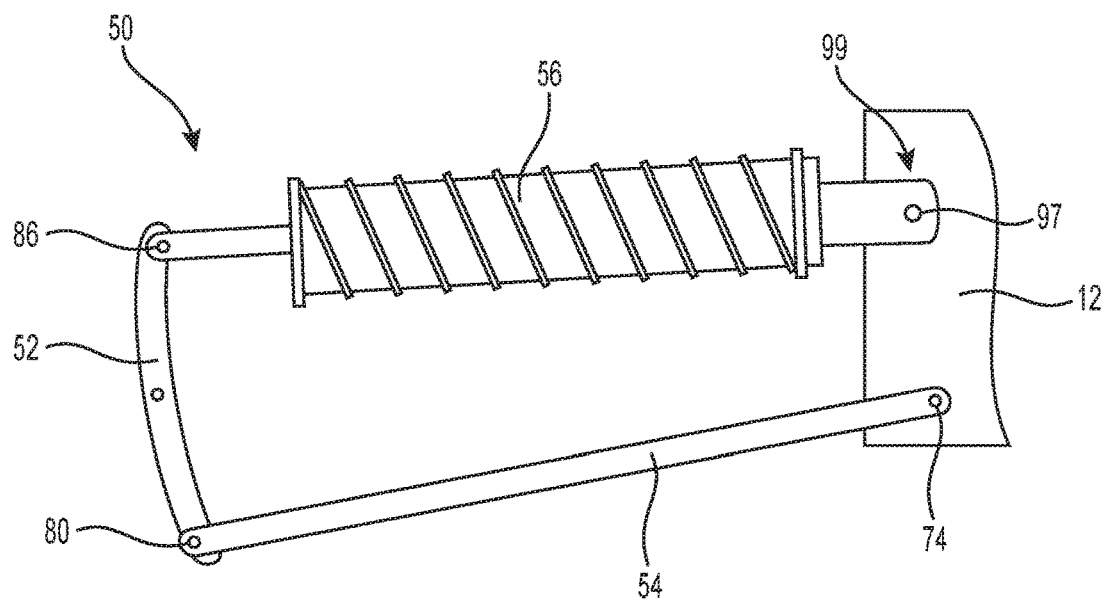

In the implementation shown in FIG. 20, rather than being pivotally connected to the linking arm 54, the shock absorber 56 is pivotally connected to the frame 12 about the shock absorber pivot axis 90. In this implementation, the shock absorber pivot axis 90 is located vertically higher than the linking arm pivot axis 74 about which the linking arm 54 is pivotally connected to the frame 12. In this example, the shock absorber pivot axis 90 is defined by a shock absorber pivot 99 established between the shock absorber 56 and the frame 12. In this implementation, the linking arm 54 is only pivotally connected to the frame 12 and the rocker link 52.

While in the implementations described above the suspension assembly 30 supports the rear wheel 16, the suspension assembly 30 may support any other suitable ground-engaging member in other implementations. For example, in the case where the suspension assembly 30 is implemented as a front suspension assembly of a snowmobile, a ski is connected to the distal end 36 of the swing arm 32 instead of a wheel. In such a case, the drive components of the wheel 16, such as the final drive unit 112 and the driveshaft 208, would not be implemented.

The vehicle 10 implemented in accordance with some non-limiting implementations of the present technology can be represented as presented in the following numbered clauses.

CLAUSE 1. A suspension assembly (30) for a vehicle (10), comprising: a swing arm (32) having a proximal end (34) and a distal end (36), the proximal end (34) of the swing arm (32) being configured to be pivotally connected to a frame (12) of the vehicle (10) about a swing arm pivot axis (35), the distal end (36) of the swing arm (36) being configured to support a ground-engaging member (16) of the vehicle (10); a rocker link (52) pivotally connected to the swing arm (32) about a rocker link pivot axis (60), the rocker link (52) having a first portion (66) and a second portion (68) extending in divergent directions from the rocker link pivot axis (60); a linking arm (54) configured to be pivotally connected to the frame (12) of the vehicle (10) about a first linking arm pivot axis (74), the linking arm (54) being pivotally connected to the first portion (66) of the rocker link (52) about a second linking arm pivot axis (80); and a shock absorber (56) being pivotable about a first shock absorber pivot axis (90), the shock absorber (56) being at least one of: pivotally connected to the linking arm (54) about the first shock absorber pivot axis (90); and configured to be pivotally connected to the frame (12) about the first shock absorber pivot axis (90); the shock absorber (56) being pivotally connected to the second portion (68) of the rocker link (52) about a second shock absorber pivot axis (86).

CLAUSE 2. The suspension assembly of clause 1, wherein a distance (D1) between the second shock absorber pivot axis (86) and the rocker link pivot axis (60) is different from a distance (D2) between the second linking arm pivot axis (80) and the rocker link pivot axis (60).

CLAUSE 3. The suspension assembly of clause 2, wherein the distance (D1) between the second shock absorber pivot axis (86) and the rocker link pivot axis (60) is greater than the distance (D2) between the second linking arm pivot axis (80) and the rocker link pivot axis (60).

CLAUSE 4. The suspension assembly of any one of clauses 1 to 3, wherein, when the suspension assembly (30) is in a driver loaded state, a distance between the first linking arm pivot axis (74) and the second linking arm pivot axis (80) is greater than a distance between the first shock absorber pivot axis (90) and the second shock absorber pivot axis (86).

CLAUSE 5. The suspension assembly of any one of clauses 1 to 4, wherein: the shock absorber (56) is pivotally connected to the linking arm (54); and the first shock absorber pivot axis (90) and the first linking arm pivot axis (74) are offset from one another.

CLAUSE 6. The suspension assembly of any one of clauses 1 to 4, wherein the first shock absorber pivot axis (90) and the first linking arm pivot axis (74) are coaxial.

CLAUSE 7. The suspension assembly of any one of clauses 1 to 4, wherein the shock absorber (56) is configured to be pivotally connected to the frame (12) about the first shock absorber pivot axis (90).

CLAUSE 8. The suspension assembly of any one of clauses 1 to 7, wherein, independent of a load state of the suspension assembly (30), an axis (L2) passing through the second shock absorber pivot axis (86) and the second linking arm pivot axis (80) extends more vertically than horizontally.

CLAUSE 9. The suspension assembly of any one of clauses 1 to 8, wherein the first linking arm pivot axis (74) is vertically higher than the swing arm pivot axis (35).

CLAUSE 10. The suspension assembly of any one of clauses 1 to 9, wherein an axis (95) extending through the first shock absorber pivot axis (90) and the second shock absorber pivot axis (86) intersects the first linking arm pivot axis (74).

CLAUSE 11. The suspension assembly of any one of clauses 1 to 10, wherein the shock absorber (56) extends generally horizontally in a full bump state of the suspension assembly (30).

CLAUSE 12. The suspension assembly of any one of clauses 1 to 11, wherein the shock absorber (56) and the rocker link (52) form an acute angle ($\delta$) in a full droop state of the suspension assembly (30).

CLAUSE 13. The suspension assembly of any one of clauses 1 to 12, wherein the shock absorber (56) comprises a damper (84) and a spring (82).

CLAUSE 14. The suspension assembly of any one of clauses 1 to 13, wherein: the swing arm (32) defines a hollow space (102); and the rocker link (52), the linking arm (54) and the shock absorber (56) at least partially extend within the hollow space (102).

CLAUSE 15. The suspension assembly of any one of clauses 1 to 3, wherein the shock absorber (56) is disposed above the linking arm (54).

CLAUSE 16. The suspension assembly of any one of clauses 1 to 3, wherein the rocker link (52) and the linking arm (54) form an acute angle ($\theta$).

CLAUSE 17. The suspension assembly of any one of clauses 1 to 15, wherein the second portion (68) of the rocker link (52) is vertically above the first portion (66) of the rocker link (52).

CLAUSE 18. The suspension assembly of any one of clauses 1 to 16, wherein the rocker link (52), the linking arm (54) and the shock absorber (56) extend through a common vertical plane (VP).

CLAUSE 19. A vehicle (10), comprising: the frame (12); the suspension assembly (30) of any one of clauses 1 to 18; and the ground-engaging member (16) connected to the distal end (36) of the swing arm (32) of the suspension assembly (30).

CLAUSE 20. The vehicle of clause 19, further comprising a muffler (220) that extends below the rocker link (52), the linking arm (54) and the shock absorber (56).

CLAUSE 21. The vehicle of clause 19, further comprising a muffler (220), the linking arm (54) being positioned, vertically, between the muffler (20) and the shock absorber (56).

CLAUSE 22. The vehicle of clause 19 or 20, wherein: the ground-engaging member (16) is a wheel having a wheel rotation axis (110); the swing arm pivot axis (35) and the wheel rotation axis (110) extend along a plane (115); and the linking arm (54) extends across the plane (115).

CLAUSE 23. The vehicle of any one of clauses 19 to 22, wherein the suspension assembly (30) is a rear suspension assembly.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A suspension assembly for a vehicle, comprising:
    a swing arm having a proximal end and a distal end, the proximal end of the swing arm being configured to be pivotally connected to a frame of the vehicle about a swing arm pivot axis, the distal end of the swing arm being configured to support a ground-engaging member of the vehicle;
    a rocker link pivotally connected to the swing arm about a rocker link pivot axis, the rocker link having a first portion and a second portion extending in divergent directions from the rocker link pivot axis;
    a linking arm configured to be pivotally connected to the frame of the vehicle about a first linking arm pivot axis, the linking arm being pivotally connected to the first portion of the rocker link about a second linking arm pivot axis; and
    a shock absorber being pivotable about a first shock absorber pivot axis, the shock absorber being at least one of:
        pivotally connected to the linking arm about the first shock absorber pivot axis; and
        configured to be pivotally connected to the frame about the first shock absorber pivot axis such that the first shock absorber pivot axis is defined by a pivot established at least between the shock absorber and the frame;
    the shock absorber being pivotally connected to the second portion of the rocker link about a second shock absorber pivot axis.

2. The suspension assembly of claim 1, wherein a distance between the second shock absorber pivot axis and the rocker link pivot axis is different from a distance between the second linking arm pivot axis and the rocker link pivot axis.

3. The suspension assembly of claim 2, wherein the distance between the second shock absorber pivot axis and the rocker link pivot axis is greater than the distance between the second linking arm pivot axis and the rocker link pivot axis.

4. The suspension assembly of claim 1, wherein, when the suspension assembly is in a driver loaded state, a distance between the first linking arm pivot axis and the second linking arm pivot axis is greater than a distance between the first shock absorber pivot axis and the second shock absorber pivot axis.

5. The suspension assembly of claim 1, wherein:
the shock absorber is pivotally connected to the linking arm; and
the first shock absorber pivot axis and the first linking arm pivot axis are offset from one another.

6. The suspension assembly of claim 1, wherein the first shock absorber pivot axis and the first linking arm pivot axis are coaxial.

7. The suspension assembly of claim 1, wherein the shock absorber is configured to be pivotally connected to the frame about the first shock absorber pivot axis.

8. The suspension assembly of claim 1, wherein, independent of a load state of the suspension assembly, an axis passing through the second shock absorber pivot axis and the second linking arm pivot axis extends more vertically than horizontally.

9. The suspension assembly of claim 1, wherein the first linking arm pivot axis is vertically higher than the swing arm pivot axis.

10. The suspension assembly of claim 1, wherein an axis extending through the first shock absorber pivot axis and the second shock absorber pivot axis intersects the first linking arm pivot axis.

11. The suspension assembly of claim 1, wherein the shock absorber extends generally horizontally in a full bump state of the suspension assembly.

12. The suspension assembly of claim 1, wherein the shock absorber and the rocker link form an acute angle in a full droop state of the suspension assembly.

13. The suspension assembly of claim 1, wherein the shock absorber comprises a damper and a spring.

14. The suspension assembly of claim 1, wherein:
the swing arm defines a hollow space; and
the rocker link, the linking arm and the shock absorber at least partially extend within the hollow space.

15. The suspension assembly of claim 1, wherein the shock absorber is disposed above the linking arm.

16. The suspension assembly of claim 1, wherein the rocker link and the linking arm form an acute angle.

17. The suspension assembly of claim 1, wherein the second portion of the rocker link is vertically above the first portion of the rocker link.

18. The suspension assembly of claim 1, wherein the rocker link, the linking arm and the shock absorber extend through a common vertical plane.

19. A vehicle, comprising:
the frame;
the suspension assembly of claim 1; and
the ground-engaging member connected to the distal end of the swing arm of the suspension assembly.

20. The vehicle of claim 19, further comprising a muffler that extends below the rocker link, the linking arm and the shock absorber.

21. The vehicle of claim 19, further comprising a muffler, the linking arm being positioned, vertically, between the muffler and the shock absorber.

22. The vehicle of claim 19, wherein:
the ground-engaging member is a wheel having a wheel rotation axis;
the swing arm pivot axis and the wheel rotation axis extend along a plane; and
the linking arm extends across the plane.

23. The vehicle of claim 19, wherein the suspension assembly is a rear suspension assembly.

24. The suspension assembly of claim 1, wherein a straight line extends through the rocker link pivot axis, the second linking arm pivot axis and the second shock absorber pivot axis.

25. The suspension assembly of claim 1, wherein the first portion and the second portion of the rocker link extend in substantially opposite directions from the rocker link pivot axis.

* * * * *